(12) United States Patent
Kaznocha et al.

(10) Patent No.: US 12,495,026 B2
(45) Date of Patent: *Dec. 9, 2025

(54) AUTO-FORM FILL BASED WEBSITE AUTHENTICATION

(71) Applicant: Google LLC, Mountain View, CA (US)

(72) Inventors: Clifton Kaznocha, Mountain View, CA (US); Erik Gustavson, Los Angeles, CA (US); Scott Kriz, Manhattan Beach, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,967

(22) Filed: Feb. 7, 2024

(65) Prior Publication Data
US 2024/0179139 A1    May 30, 2024

Related U.S. Application Data

(63) Continuation of application No. 17/049,126, filed as application No. PCT/US2018/029656 on Apr. 26, 2018, now Pat. No. 11,909,729.

(51) Int. Cl.
*H04L 9/40* (2022.01)
*G06F 16/955* (2019.01)

(52) U.S. Cl.
CPC ............ *H04L 63/08* (2013.01); *G06F 16/955* (2019.01)

(58) Field of Classification Search
CPC ... H04L 63/08; H04L 63/0815; G06F 16/955; G06F 2221/2115; G06F 21/31; H04W 12/068
See application file for complete search history.

(56) References Cited

U.S. PATENT DOCUMENTS

| | | |
|---|---|---|
| 6,038,603 A | 3/2000 | Joseph |
| 6,182,085 B1 | 1/2001 | Eichstaedt et al. |
| | (Continued) | |

FOREIGN PATENT DOCUMENTS

| | | |
|---|---|---|
| AU | 2003261124 A1 | 1/2004 |
| CN | 102968584 A | 3/2013 |
| | (Continued) | |

OTHER PUBLICATIONS

International Search Report for the Application No. PCT/US2018/029656, dated Apr. 26, 2018, 13 pages.

(Continued)

*Primary Examiner* — Aravind K Moorthy
(74) *Attorney, Agent, or Firm* — Honigman LLP; Brett A. Krueger

(57) ABSTRACT

A method for a website authentication is provided. The method includes receiving a reference uniform resource locator (URL) at a browser and determining whether the reference URL adheres to an authentication protocol including a credential identifier and a web authentication host URL. When the reference URL adheres to the authentication protocol, the method also includes extracting the credential identifier and the web authentication host URL from the reference URL. The method further includes obtaining credential data from a remote service using the credential identifier and sending web authentication instructions to the browser. The web authentication instructions include the web authentication host URL and the credential data.

18 Claims, 14 Drawing Sheets

(56) References Cited

U.S. PATENT DOCUMENTS

| | | | |
|---|---|---|---|
| 6,557,038 B1 | 4/2003 | Becker et al. | |
| 6,587,880 B1 | 7/2003 | Saigo et al. | |
| 6,594,697 B1* | 7/2003 | Praitis | G06F 11/327 |
| | | | 709/227 |
| 6,901,431 B1 | 5/2005 | Dodrill et al. | |
| 6,925,485 B1 | 8/2005 | Wang et al. | |
| 6,996,718 B1 | 2/2006 | Henry et al. | |
| 7,003,576 B2 | 2/2006 | Bjornestad et al. | |
| 7,263,722 B1 | 8/2007 | Luo et al. | |
| 7,322,040 B1* | 1/2008 | Olson | H04L 63/205 |
| | | | 726/8 |
| 7,437,437 B2* | 10/2008 | Kennedy | H04Q 3/002 |
| | | | 707/999.009 |
| 7,581,111 B2* | 8/2009 | Wagner | G06F 21/305 |
| | | | 713/168 |
| 7,596,804 B2 | 9/2009 | Toomey et al. | |
| 7,603,320 B1 | 10/2009 | Shu | |
| 7,809,858 B1 | 10/2010 | Brown | |
| 8,201,217 B1* | 6/2012 | Begen | H04L 63/0815 |
| | | | 726/2 |
| 8,219,826 B2* | 7/2012 | Perkins | G07F 7/1025 |
| | | | 713/184 |
| 8,423,899 B1* | 4/2013 | Crane | G06F 21/31 |
| | | | 715/780 |
| 8,438,631 B1 | 5/2013 | Taylor et al. | |
| 8,607,306 B1 | 12/2013 | Bridge et al. | |
| 8,677,115 B2* | 3/2014 | Paris | H04L 63/08 |
| | | | 726/5 |
| 8,775,807 B1* | 7/2014 | Vazquez | G06F 21/31 |
| | | | 713/168 |
| 8,850,520 B1* | 9/2014 | Pike | G06F 21/00 |
| | | | 709/201 |
| 8,856,896 B1* | 10/2014 | Johansson | H04L 9/0891 |
| | | | 726/6 |
| 8,954,004 B1 | 2/2015 | Wang et al. | |
| 9,001,370 B1 | 4/2015 | Nuggehalli | |
| 9,053,297 B1 | 6/2015 | Fitch et al. | |
| 9,106,423 B1 | 8/2015 | Salinas et al. | |
| 9,111,074 B1 | 8/2015 | Friedman et al. | |
| 9,131,382 B1* | 9/2015 | Johns | H04W 12/128 |
| 9,172,697 B1* | 10/2015 | Holtz | H04L 63/083 |
| 9,173,101 B1* | 10/2015 | Angelov | H04L 63/08 |
| 9,240,886 B1* | 1/2016 | Allen | H04L 63/08 |
| 9,264,415 B1* | 2/2016 | Saylor | G06F 21/46 |
| 9,386,006 B1* | 7/2016 | Maldaner | G06F 40/134 |
| 9,391,782 B1 | 7/2016 | Mironenko | |
| 9,473,380 B1 | 10/2016 | Bermudez et al. | |
| 9,516,018 B1* | 12/2016 | Vazquez | G06F 21/34 |
| 9,536,067 B1* | 1/2017 | Lee | G06F 21/31 |
| 9,640,001 B1* | 5/2017 | Vazquez | H04L 63/107 |
| 9,648,011 B1* | 5/2017 | Mattsson | H04L 9/3226 |
| 9,703,802 B1 | 7/2017 | Ward | |
| 9,703,988 B1* | 7/2017 | Sudbury | G06F 21/64 |
| 9,794,239 B1* | 10/2017 | Chaudhry | G06F 21/34 |
| 9,854,308 B1* | 12/2017 | Chaudhry | H04N 21/4622 |
| 9,961,070 B2 | 5/2018 | Tang | |
| 9,967,236 B1 | 5/2018 | Ashley et al. | |
| 9,973,374 B1* | 5/2018 | Ratias | H04W 12/068 |
| 10,002,029 B1 | 6/2018 | Bequet et al. | |
| 10,069,812 B1 | 9/2018 | Moturu | |
| 10,142,333 B1* | 11/2018 | Griffin | H04L 9/3231 |
| 10,193,884 B1* | 1/2019 | Griffin | G06F 21/33 |
| 10,257,179 B1* | 4/2019 | Saylor | H04W 12/068 |
| 10,432,618 B1* | 10/2019 | Poder | H04L 63/0861 |
| 10,454,897 B1 | 10/2019 | Rajanna et al. | |
| 10,523,686 B1* | 12/2019 | Mehta | H04L 63/083 |
| 10,552,823 B1 | 2/2020 | Woodward et al. | |
| 10,567,363 B1* | 2/2020 | Ficarra | H04L 63/1441 |
| 10,572,641 B1* | 2/2020 | Griffin | H04L 9/50 |
| 10,733,329 B1* | 8/2020 | Ragupathy | G06F 21/78 |
| 10,783,237 B2* | 9/2020 | Chen | G06Q 10/00 |
| 10,797,885 B1* | 10/2020 | Griffin | H04L 9/3231 |
| 10,938,925 B1 | 3/2021 | Fitzhugh et al. | |
| 11,283,785 B2* | 3/2022 | Yu | H04L 67/306 |
| 11,799,847 B2* | 10/2023 | Sarkissian | H04L 63/083 |
| 11,909,729 B2* | 2/2024 | Kaznocha | G06F 21/31 |
| 2002/0007460 A1 | 1/2002 | Azuma | |
| 2003/0056224 A1 | 3/2003 | Stone | |
| 2003/0135765 A1* | 7/2003 | Hind | G06F 21/6227 |
| | | | 726/7 |
| 2003/0163691 A1 | 8/2003 | Johnson | |
| 2003/0204601 A1 | 10/2003 | Takano | |
| 2004/0019610 A1 | 1/2004 | Burns | |
| 2004/0068584 A1 | 4/2004 | Costa-Requena et al. | |
| 2004/0152448 A1 | 8/2004 | Passi | |
| 2004/0158746 A1 | 8/2004 | Hu et al. | |
| 2004/0225709 A1* | 11/2004 | Kubler | H04L 63/102 |
| | | | 709/200 |
| 2004/0230536 A1 | 11/2004 | Fung et al. | |
| 2004/0230831 A1* | 11/2004 | Spelman | H04L 63/0815 |
| | | | 726/8 |
| 2004/0250118 A1 | 12/2004 | Andreev et al. | |
| 2005/0044380 A1 | 2/2005 | Bostick et al. | |
| 2005/0055398 A1 | 3/2005 | Olson et al. | |
| 2005/0108520 A1 | 5/2005 | Yamamoto et al. | |
| 2005/0177731 A1* | 8/2005 | Torres | H04L 67/02 |
| | | | 713/182 |
| 2005/0188226 A1 | 8/2005 | Kasatani | |
| 2005/0195446 A1 | 9/2005 | Kasatani | |
| 2005/0204173 A1 | 9/2005 | Chang | |
| 2005/0210031 A1 | 9/2005 | Kasatani | |
| 2005/0216582 A1 | 9/2005 | Toomey et al. | |
| 2005/0246383 A1* | 11/2005 | Desai | H04L 63/101 |
| 2006/0106802 A1* | 5/2006 | Giblin | H04L 63/10 |
| | | | 707/E17.112 |
| 2006/0129933 A1* | 6/2006 | Land | G11B 27/34 |
| | | | 345/473 |
| 2006/0136400 A1* | 6/2006 | Marr | G06F 16/9535 |
| 2006/0185021 A1* | 8/2006 | Dujari | H04L 63/0807 |
| | | | 726/27 |
| 2006/0265279 A1 | 11/2006 | Livingston et al. | |
| 2007/0038568 A1 | 2/2007 | Greene et al. | |
| 2007/0067489 A1* | 3/2007 | Blank | H04L 61/301 |
| | | | 709/238 |
| 2007/0104326 A1 | 5/2007 | Feigenbaum et al. | |
| 2007/0136413 A1 | 6/2007 | Ishikawa et al. | |
| 2007/0136794 A1* | 6/2007 | Chin | H04L 63/08 |
| | | | 726/5 |
| 2007/0180127 A1 | 8/2007 | Vuori | |
| 2007/0226783 A1 | 9/2007 | Mimlitsch | |
| 2007/0233828 A1* | 10/2007 | Gilbert | G06F 16/907 |
| | | | 707/E17.143 |
| 2007/0244904 A1 | 10/2007 | Durski | |
| 2008/0027914 A1 | 1/2008 | Caputo et al. | |
| 2008/0027949 A1* | 1/2008 | Kawada | G06F 16/93 |
| | | | 707/999.102 |
| 2008/0072300 A1* | 3/2008 | Garbow | H04L 63/0815 |
| | | | 726/8 |
| 2008/0127097 A1 | 5/2008 | Zhao et al. | |
| 2008/0134305 A1* | 6/2008 | Hinton | H04L 63/08 |
| | | | 726/5 |
| 2008/0140861 A1 | 6/2008 | Kothari et al. | |
| 2008/0147683 A1* | 6/2008 | Chutczer | H04N 21/4334 |
| 2008/0240490 A1 | 10/2008 | Finkelstein et al. | |
| 2008/0256087 A1 | 10/2008 | Piironen et al. | |
| 2008/0276098 A1 | 11/2008 | Florencio et al. | |
| 2009/0049533 A1 | 2/2009 | Kim | |
| 2009/0144812 A1 | 6/2009 | Sasamura et al. | |
| 2009/0164447 A1 | 6/2009 | Daya | |
| 2009/0164796 A1* | 6/2009 | Peirce | H04L 9/3234 |
| | | | 713/186 |
| 2009/0214087 A1* | 8/2009 | Hsueh | G06F 21/32 |
| | | | 382/118 |
| 2009/0271371 A1 | 10/2009 | Levin et al. | |
| 2009/0328169 A1 | 12/2009 | Hutchison et al. | |
| 2010/0017616 A1 | 1/2010 | Nichols et al. | |
| 2010/0024013 A1* | 1/2010 | Cheng | H04L 63/18 |
| | | | 726/5 |
| 2010/0064355 A1 | 3/2010 | Toomey et al. | |
| 2010/0205053 A1 | 8/2010 | Shuster | |
| 2010/0223358 A1 | 9/2010 | Schneider | |
| 2010/0241865 A1 | 9/2010 | Chang et al. | |

(56) References Cited

U.S. PATENT DOCUMENTS

| | | | |
|---|---|---|---|
| 2011/0055250 A1 | 3/2011 | Nandy et al. | |
| 2011/0055586 A1* | 3/2011 | Lupton | G07F 7/1091 |
| | | | 713/184 |
| 2011/0113245 A1* | 5/2011 | Varadarajan | G06F 21/34 |
| | | | 713/168 |
| 2011/0126024 A1* | 5/2011 | Beatson | H04L 9/3226 |
| | | | 713/186 |
| 2011/0161510 A1 | 6/2011 | Arnold et al. | |
| 2011/0207433 A1 | 8/2011 | Miyamoto | |
| 2011/0276414 A1 | 11/2011 | Subbarao et al. | |
| 2011/0314532 A1 | 12/2011 | Austin et al. | |
| 2011/0321141 A1 | 12/2011 | Zeng et al. | |
| 2012/0054357 A1* | 3/2012 | Kuritzky | H04L 63/083 |
| | | | 709/229 |
| 2012/0131471 A1* | 5/2012 | Terlouw | H04W 12/02 |
| | | | 715/741 |
| 2012/0204225 A1* | 8/2012 | Cohen | G06F 21/32 |
| | | | 726/3 |
| 2012/0204242 A1* | 8/2012 | Cohen | H04L 63/08 |
| | | | 726/5 |
| 2012/0252405 A1 | 10/2012 | Lortz et al. | |
| 2012/0297190 A1 | 11/2012 | Shen et al. | |
| 2013/0085906 A1 | 4/2013 | Cottingham et al. | |
| 2013/0104202 A1 | 4/2013 | Yin et al. | |
| 2013/0110802 A1* | 5/2013 | Shenoy | G06F 16/955 |
| | | | 707/706 |
| 2013/0110832 A1* | 5/2013 | Wood | G06F 16/176 |
| | | | 707/736 |
| 2013/0124687 A1 | 5/2013 | Nam et al. | |
| 2013/0124856 A1* | 5/2013 | Agrawal | H04L 63/10 |
| | | | 713/156 |
| 2013/0132817 A1 | 5/2013 | Sharad et al. | |
| 2013/0159840 A1 | 6/2013 | Nicolaescu | |
| 2013/0173964 A1 | 7/2013 | Okano | |
| 2013/0179005 A1 | 7/2013 | Nishimoto et al. | |
| 2013/0179941 A1* | 7/2013 | McGloin | G06Q 10/10 |
| | | | 726/3 |
| 2013/0211934 A1* | 8/2013 | Balasubramanian | G06Q 30/04 |
| | | | 705/16 |
| 2013/0246528 A1 | 9/2013 | Ogura | |
| 2014/0007197 A1* | 1/2014 | Wray | G06F 21/6218 |
| | | | 726/4 |
| 2014/0033273 A1 | 1/2014 | Rathbun | |
| 2014/0082715 A1* | 3/2014 | Grajek | H04W 12/068 |
| | | | 726/8 |
| 2014/0148136 A1* | 5/2014 | Thange | H04M 3/4228 |
| | | | 455/414.1 |
| 2014/0165165 A1 | 6/2014 | Story, Jr. | |
| 2014/0201335 A1* | 7/2014 | Wang | H04L 65/612 |
| | | | 709/219 |
| 2014/0249844 A1* | 9/2014 | Liberty | G16H 10/60 |
| | | | 705/2 |
| 2014/0259105 A1 | 9/2014 | Alibakhsh et al. | |
| 2014/0281562 A1* | 9/2014 | Kespohl | H04L 9/3226 |
| | | | 713/184 |
| 2014/0310808 A1 | 10/2014 | Yao et al. | |
| 2014/0333713 A1 | 11/2014 | Shoemake et al. | |
| 2014/0357187 A1* | 12/2014 | Ehrensvard | H04L 63/0838 |
| | | | 455/41.1 |
| 2014/0366117 A1* | 12/2014 | Kumar | H04L 63/10 |
| | | | 726/11 |
| 2015/0007278 A1 | 1/2015 | Benezra | |
| 2015/0020178 A1 | 1/2015 | Grunin et al. | |
| 2015/0096001 A1 | 4/2015 | Morikuni et al. | |
| 2015/0113626 A1 | 4/2015 | Bocanegra Alvarez et al. | |
| 2015/0121482 A1 | 4/2015 | Berman et al. | |
| 2015/0121484 A1* | 4/2015 | Liu | H04L 63/08 |
| | | | 726/5 |
| 2015/0150106 A1* | 5/2015 | Lund | H04L 63/083 |
| | | | 726/7 |
| 2015/0172294 A1* | 6/2015 | Bittner | G06F 21/6245 |
| | | | 726/4 |
| 2015/0207660 A1 | 7/2015 | Sundaram et al. | |
| 2015/0235179 A1* | 8/2015 | Schmidt | G06Q 10/1053 |
| | | | 705/321 |
| 2015/0281227 A1 | 10/2015 | Fox Ivey et al. | |
| 2015/0281229 A1 | 10/2015 | Kang et al. | |
| 2015/0350186 A1 | 12/2015 | Chan et al. | |
| 2016/0078217 A1* | 3/2016 | Das | G06F 21/45 |
| | | | 726/18 |
| 2016/0094534 A1* | 3/2016 | Banno | H04L 63/08 |
| | | | 726/4 |
| 2016/0112396 A1* | 4/2016 | Paya | H04L 63/083 |
| | | | 713/156 |
| 2016/0124782 A1 | 5/2016 | Gruby et al. | |
| 2016/0156719 A1 | 6/2016 | Mobarak et al. | |
| 2016/0164681 A1* | 6/2016 | Jiang | H04L 9/3226 |
| | | | 713/183 |
| 2016/0191970 A1 | 6/2016 | Sheppard et al. | |
| 2016/0212113 A1 | 7/2016 | Banerjee | |
| 2016/0285871 A1* | 9/2016 | Chathoth | H04L 63/0807 |
| 2016/0301683 A1* | 10/2016 | Laxminarayanan | H04L 67/02 |
| 2016/0335451 A1* | 11/2016 | Sinor | H04L 63/08 |
| 2016/0335457 A1* | 11/2016 | Robinton | G06F 21/6209 |
| 2016/0352840 A1* | 12/2016 | Negron | H04L 63/083 |
| 2016/0358013 A1* | 12/2016 | Carter | G06F 21/32 |
| 2017/0033934 A1* | 2/2017 | Camenisch | H04L 9/3263 |
| 2017/0048245 A1 | 2/2017 | Owen et al. | |
| 2017/0064011 A1* | 3/2017 | Sheth | H04L 67/02 |
| 2017/0078275 A1* | 3/2017 | Slovetskiy | H04N 21/43615 |
| 2017/0099280 A1* | 4/2017 | Goel | H04L 67/146 |
| 2017/0118215 A1 | 4/2017 | Varadarajan et al. | |
| 2017/0147826 A1 | 5/2017 | Farkash et al. | |
| 2017/0171200 A1* | 6/2017 | Bao | H04L 9/3213 |
| 2017/0180351 A1* | 6/2017 | Lu | H04L 67/146 |
| 2017/0195274 A1* | 7/2017 | Liberty | H04L 51/42 |
| 2017/0195319 A1 | 7/2017 | Gerber et al. | |
| 2017/0199872 A1 | 7/2017 | Krasadakis | |
| 2017/0213206 A1 | 7/2017 | Shearer | |
| 2017/0237726 A1 | 8/2017 | Wang | |
| 2017/0244672 A1 | 8/2017 | Shulman et al. | |
| 2017/0244695 A1* | 8/2017 | Lund | H04L 63/083 |
| 2017/0250998 A1 | 8/2017 | Miliefsky et al. | |
| 2017/0251002 A1 | 8/2017 | Rostamabadi et al. | |
| 2017/0272485 A1* | 9/2017 | Gordon | H04L 65/612 |
| 2017/0329944 A1* | 11/2017 | Satyavarapu | H04L 63/083 |
| 2017/0346797 A1* | 11/2017 | Yedidi | H04L 63/14 |
| 2017/0346830 A1 | 11/2017 | Goldfarb et al. | |
| 2017/0366547 A1 | 12/2017 | Goldfarb et al. | |
| 2018/0034901 A1* | 2/2018 | Shnitko | H04L 61/30 |
| 2018/0075231 A1 | 3/2018 | Subramanian et al. | |
| 2018/0083986 A1* | 3/2018 | Hurley | H04L 63/1416 |
| 2018/0091490 A1* | 3/2018 | Wang | H04L 63/0407 |
| 2018/0091500 A1* | 3/2018 | Baty | G06K 7/10009 |
| 2018/0124068 A1 | 5/2018 | Ruhlen et al. | |
| 2018/0167426 A1* | 6/2018 | Sigurdsson | H04L 65/1069 |
| 2018/0219680 A1* | 8/2018 | Kamal | G06F 21/53 |
| 2018/0316510 A1 | 11/2018 | Rai et al. | |
| 2018/0332042 A1 | 11/2018 | Yu et al. | |
| 2018/0375645 A1* | 12/2018 | Hanumantharau | H04L 63/083 |
| 2019/0005023 A1* | 1/2019 | Olsen | G06F 40/30 |
| 2019/0026456 A1 | 1/2019 | Hon et al. | |
| 2019/0138280 A1* | 5/2019 | Ma | G06F 8/60 |
| 2019/0146902 A1* | 5/2019 | Jiang | G06F 11/3688 |
| | | | 717/129 |
| 2019/0147178 A1 | 5/2019 | Baldwin et al. | |
| 2019/0197747 A1 | 6/2019 | Garcia et al. | |
| 2019/0213553 A1 | 7/2019 | Ragsdale et al. | |
| 2019/0215375 A1 | 7/2019 | Ragsdale et al. | |
| 2020/0084199 A1* | 3/2020 | Lupien | G06F 40/174 |
| 2020/0366484 A1* | 11/2020 | So | H04L 9/3213 |
| 2021/0021416 A1* | 1/2021 | Colmenares | G06F 16/904 |

FOREIGN PATENT DOCUMENTS

| | | |
|---|---|---|
| CN | 103646081 A | 3/2014 |
| CN | 104270404 A | 1/2015 |
| CN | 106961415 A | 7/2017 |
| TW | 201206138 A | 2/2012 |
| WO | 2004006499 A1 | 1/2004 |
| WO | 2005022893 A2 | 3/2005 |

(56) References Cited

FOREIGN PATENT DOCUMENTS

OTHER PUBLICATIONS

Indian Examination Report for the related Application No. 202047046545, dated Sep. 16, 2021, 6 pages.
China National Intellectual Property Administration. Office Action relating to Application No. 201880092757.4, dated May 6, 2022.
USPTO. Office Action relating to U.S. Appl. No. 17/049,126, dated May 23, 2023.

* cited by examiner

AUTO-FORM FILL BASED WEBSITE AUTHENTICATION

CROSS REFERENCE TO RELATED APPLICATIONS

This U.S. patent application is a continuation of, and claims priority under 35 U.S.C. § 120 from, U.S. patent application Ser. No. 17/049,126, filed on Oct. 20, 2020, which is a U.S. national phase application under 35 U.S.C. § 371 of PCT application PCT/US2018/029656, filed on Apr. 26, 2018. The disclosures of these prior art applications are considered part of the disclosure of this application and are hereby incorporated by reference in their entireties.

TECHNICAL FIELD

This disclosure relates to auto-form fill based website authentication.

BACKGROUND

With the vast amount of computing resources today, users, owners, and administrators of resources often limit or restrict resource access. For these restrictions, it is commonplace to use credentials to verify and authenticate identities of entities who are attempting to access the resources. Thus, credentials have become an integral part of resource access. This is especially true for larger computing environments (cloud service environments and distributed systems) that have shared resources among numerous users. With the ever-increasing use of credentials, entities having access rights to resources with credentials, spend time managing, organizing, and submitting credentials.

SUMMARY

One aspect of the disclosure provides a method for website authentication. The method includes receiving, at data processing hardware, a reference uniform resource locator (URL) at a browser and determining, by the data processing hardware, whether the reference URL adheres to an authentication protocol including a credential identifier and a web authentication host URL. When the reference URL adheres to the authentication protocol, the method also includes extracting, by the data processing hardware, the credential identifier and the web authentication host URL from the reference URL, obtaining, by the data processing hardware, credential data from a remote service using the credential identifier, and sending web authentication instructions to the browser. The web authentication instructions include the web authentication host URL and the credential data.

Implementations of the disclosure may include one or more of the following optional features. In some implementations, the reference URL adheres to either the authentication protocol or a Hypertext Transfer Protocol (HTTP). The credential data may include a username and a password. The authentication protocol may include a user identifier. When the authentication protocol includes a user identifier, the user identifier and the credential identifier may include object identifiers. The object identifiers are configured to publically obfuscate an identity of a user associated with the user identifier and a credential associated with the credential identifier. Additionally or alternatively, the authentication protocol may include a user identifier combined with the credential identifier as a single identifier.

In some examples, the web authentication instructions configure the browser to auto-populate a login form at the web authentication host URL using the credential data based on the web authentication instructions. The web authentication instructions may include a login URL and may configure the browser to: execute the login URL, the login URL navigating to a login page associated with the web authentication host URL; determine login fields by parsing a document object model of the login page; populate the login fields using the credential data based on the web authentication instructions; and redirect the browser to the web authentication host URL. The authentication protocol may also include a custom protocol identifier. Optionally, the authentication protocol may include a format of web+credential://{Credential ID}@{Web Host}.

Another aspect of the disclosure provides a method for website authentication. The method includes receiving, at data processing hardware, references to web resources, a first reference having a first protocol formatting, the remaining references having a second protocol formatting. The method also includes identifying, by the data processing hardware, the first reference as having the first protocol formatting and executing, by the data processing hardware, an automated website login routine using the first reference. The automated website login routine is configured to extract a credential identifier and a web host identifier from the first reference and obtain credential data corresponding to the credential identifier. The credential data includes a user credential. The automated website login routine is also configured to obtain a uniform resource locator (URL) for a login page corresponding to the web host identifier and automatically log into the login page corresponding to the web host identifier using the user credential.

This aspect may include one or more of the following optional features. In some configurations, automatically logging into the login page includes parsing a document object model (DOM) of the login page to identify a username field and a password field, inserting a user name of the user credential into the username field, and inserting a password of the user credential into the password field. The first protocol formatting may include web+credential://{User OID}:{Credential OID}@{Web App Host}/.

In some implementations, the method includes receiving, at the data processing hardware, a format of web+credential://{Web App Host}/ as the first reference. Here, the method also includes identifying, by the data processing hardware, the format of web+credential://{Web App Host}/ as an incomplete first protocol formatting. In this implementation, the automated website login routine is configured to extract the web host identifier from the first reference, obtain the uniform resource locator (URL) for the login page corresponding to the web host identifier, and display the login page corresponding to the web host identifier in response to the received references including the format of web+credential://{Web App Host}/ as the first reference.

In some examples, receiving references to web resources includes a uniform resource locator (URL). The first protocol formatting may include a custom protocol identifier. The user credential identifier may include a user identifier and a credential identifier. Optionally, the method may include redirecting, by the data processing hardware, to the web resources of the received references. When the user credential identifier includes an object identifier, the object identifier may be configured to publically obfuscate an identity of a user associated with the user credential identifier. The user credential may include a username and a password.

Another aspect of the disclosure provides a system for website authentication. The system includes data processing hardware and memory hardware in communication with the data processing hardware. The memory hardware stores instructions that when executed by the data processing hardware cause the data processing hardware to perform operations. The operations include receiving a reference uniform resource locator (URL) at a browser and determining whether the reference URL adheres to an authentication protocol including a credential identifier and a web authentication host URL. When the reference URL adheres to the authentication protocol, the operations also include extracting the credential identifier and the web authentication host URL from the reference URL, obtaining credential data from a remote service using the credential identifier, and sending web authentication instructions to the browser. The web authentication instructions include the web authentication host URL and the credential data.

Implementations of this system may include one or more of the following optional features. In some implementations, the reference URL adheres to either the authentication protocol or a Hypertext Transfer Protocol (HTTP). The credential data may include a username and a password. The authentication protocol may include a user identifier. When the authentication protocol includes a user identifier, the user identifier and the credential identifier may include object identifiers. The object identifiers are configured to publically obfuscate an identity of a user associated with the user identifier and a credential associated with the credential identifier. Additionally or alternatively, the authentication protocol may include a user identifier combined with the credential identifier as a single identifier.

In some examples, the web authentication instructions configure the browser to auto-populate a login form at the web authentication host URL using the credential data based on the web authentication instructions. The web authentication instructions may include a login URL and may configure the browser to: execute the login URL, the login URL navigating to a login page associated with the web authentication host URL; determine login fields by parsing a document object model of the login page; populate the login fields using the credential data based on the web authentication instructions; and redirect the browser to the web authentication host URL. The authentication protocol may also include a custom protocol identifier. Optionally, the authentication protocol may include a format of web+credential://{Credential ID}@{Web Host}.

Yet another aspect of the disclosure provides a system for website authentication. The system includes data processing hardware and memory hardware in communication with the data processing hardware. The memory hardware stores instructions that when executed by the data processing hardware cause the data processing hardware to perform operations. The operations include receiving references to web resources. A first reference has a first protocol formatting and the remaining references have a second protocol formatting. The operations also include identifying the first reference as having the first protocol formatting and executing an automated website login routine using the first reference. The automated website login routine is configured to extract a credential identifier and a web host identifier from the first reference and obtain credential data corresponding to the credential identifier. The credential data includes a user credential. The automated website login routine is also configured to obtain a uniform resource locator (URL) for a login page corresponding to the web host identifier and automatically log into the login page corresponding to the web host identifier using the user credential.

This aspect may include one or more of the following optional features. In some configurations, automatically logging into the login page includes parsing a document object model (DOM) of the login page to identify a username field and a password field, inserting a user name of the user credential into the username field, and inserting a password of the user credential into the password field. The first protocol formatting may include web+credential://{User OID}:{Credential OID}@{Web App Host}/.

In some implementations, the operations include receiving a format of web+credential://{Web App Host}/ as the first reference. Here, the operations also include identifying the format of web+credential://{Web App Host}/ as an incomplete first protocol formatting. In this implementation, the automated website login routine is configured to extract the web host identifier from the first reference, obtain the uniform resource locator (URL) for the login page corresponding to the web host identifier, and display the login page corresponding to the web host identifier in response to the received references including the format of web+credential://{Web App Host}/ as the first reference.

In some examples, receiving references to web resources includes a uniform resource locator (URL). The first protocol formatting may include a custom protocol identifier. The user credential identifier may include a user identifier and a credential identifier. Optionally, the operations may include redirecting to the web resources of the received references. When the user credential identifier includes an object identifier, the object identifier may be configured to publically obfuscate an identity of a user associated with the user credential identifier. The user credential may include a username and a password.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

An authentication manager is a tool to simplify credential management for a user and/or browser. For example, there are webpages that the user often visits that request a login for each visit. Each login requires a user time to complete the login process. As resources become more accessible via webpages and/or as resources increase security procedures requiring security credentials, more webpages that the user encounters request login credentials to authenticate the user. In these situations, the user may be left managing credentials across many webpages as well as spending time entering and submitting credentials to authenticate the user's permission to access each webpage. Therefore, in some capacity, the authentication manager provides an efficient and reliable authentication process for the user as an intermediary between authentication credentials of the user and a resource such as a webpage.

Implementations herein further solve the technical problem of how to create a secure and a reliable credential management system to access resources with automated authentication by the technical solution that includes a browser extension and/or a central credential management webpage. Here, both the browser extension and the central credential management webpage allow for custom uniform resource locator (URL) protocols to access web resources requiring a user authentication via a login. The browser extension intercepts or otherwise observes the URL navigation at a browser. The custom URL includes a format that identifies the customer protocol, a host of the web resource, and a user credential for authenticating the user to access the web resource. The custom URL permits transparency such that the user knows authentication will occur when navigating to the custom URL, as well as security since the URL does not itself reveal or expose the actual credential or identity of the user. Based on the resource host and credential identifier information, the authentication manager (e.g. a password management system, which may or may not be remotely located) provides the user credential with data such that the browser extension or central webpage may initiate the automated authentication of the user. For example, the browser extension may pass the user credential data to a web browser (or other application through which the URL has been accessed, selected, or input) for auto-filling user login fields required for accessing the web resource of interest.

Figure 1:
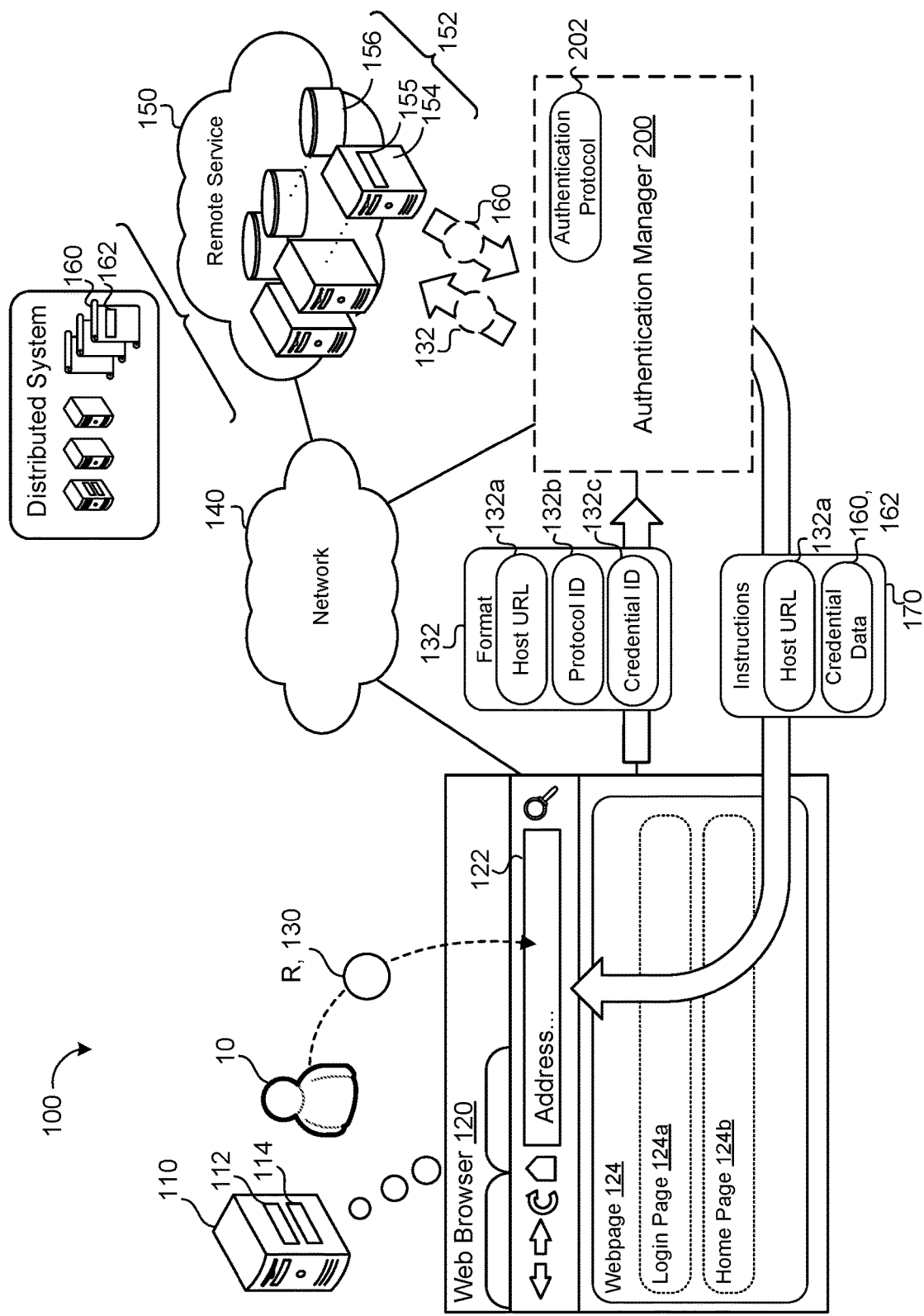
FIG. 1 is a schematic view of an example authentication environment.

FIG. 1 is an example of an authentication environment 100. The authentication environment 100 generally includes a user device 110 associated with a user 10 communicating, via a browser 120 over a network 140, with remote services 150. The remote services 150 may be located within a distributed system (e.g., a cloud environment) having scalable/elastic resources 152. The resources 152 include computing resources 154 (e.g., data processing hardware) and/or storage resources 156 (e.g., memory hardware). In other examples, the remote services 150 communicate with a distributed system.

In some examples, the user 10 interfaces with the resources 152 (e.g., web resources) via the web browser 120. The web browser 120 is a program configured to access these resources 152 and display these resources 152 through a webpage 124. A webpage 124 generally refers to a presentation of resources 152 in a document with elements such as style sheets, scripts, images, etc. A webpage 124 may be static or dynamic such that it may include web hosted applications 155. A web hosted application 155 refers to a program hosted on a server that a web browser 120 may access via the network 140. For example, a webpage 124 corresponds to a web hosted application 155 located on a server of the distributed system (i.e., executing on computing resources 154) in communication with the web browser 120 over the network 140. These web hosted applications 155 may also execute on other computing resources separate from the remote service 150.

In some implementations, access to a resource 152 through a webpage 124 requires authentication of the user 10. In other words, the user 10 may only access the resource 152 once the user 10 is authenticated as having permission to access the resource 152. A common method of authentication for a web resource 152 is a login prompt on a webpage 124, such as a login page 124a. Once the user 10 logs into the webpage 124, the user 10 may proceed to a home page 124b. In some examples, to login to a webpage 124, a remote service 150 provides credential data 160 for the user 10 to access the web resource 152 via the browser 120. For example, the user 10 uses credential data 160 as a form of authentication to login to the webpage 124. In some examples, the authentication environment 100 includes an authentication manager 200 for managing the authentication process for the user 10 to login to webpages 124.

The user device 110 can be any computing devices or data processing hardware capable of communicating with remote services 150 via the browser 120. With continued reference to FIG. 1, the user device 110 includes data processing hardware 112 and memory hardware 114. The user device 110, includes, but is not limited to, desktop computing devices and mobile computing devices, such as laptops, tablets, smart phones, and wearable computing devices (e.g., headsets and/or watches). The user device 110 is configured such that the user 10 views webpages 124 using the browser 120 executing on the user device 110 (e.g., via a display of the user device 110).

The user device 110 may download a browser 120, such as CHROME®, FIREFOX®, OPERA®, EXPLORER®, etc. to the memory hardware 114 and execute the browser 120 on the data processing hardware 112 when the user 10 decides to use the web browser 120. The web browser (also referred to as "browser") 120 includes an address field 122 for receiving references R to web resources 152. The reference R generally conveys to the browser 120 a destination, such as a webpage 124, that the user 10 wants to access. The browser 120 uses the reference R entered by the user 10 into the address field 122 to navigate to the destination webpage 124. The browser 120 may receive the reference R directly or indirectly from the user 10. For example, the browser 120 may receive the reference R directly from the user 10 via a user input, such as typing the reference R (e.g., URL 130) into the address field 122 of the web browser 120 or via a speech input. In other examples, the browser 120 receives the reference R indirectly from the user 10 when the user 10 selects a hyperlink associated with the reference R that auto-populates the address field 122. The user 10 may select the hyperlink of the reference R by selecting an object or an icon embedding the hyperlink.

To achieve standardization for referencing web resources 152, references R often include a format 132 that the browser 120 can interpret to understand how and/or where to navigate for the desired web resource(s) 152. In some examples, the reference R to the web resource(s) 152 is a uniform resource identifier (URI) such as a uniform resource locator (URL) 130. The URL 130 has a format 132 that indicates a name of a resource and a protocol used to fetch the resource. As a basic example, the URL 130, http://patent.com, has a protocol of "http" and a resource name of "patent.com." The protocol of "http" indicates to the browser 120 to use the Hypertext Transfer Protocol (HTTP) to access the "patent.com" resource. Although HTTP and HTTPS (Hypertext Transfer Protocol Secure) are two commonly used protocols to navigate to web resources, other protocols exist (e.g., file transfer protocol (FTP), internet message access protocol (IMAP), internet printing protocol (IPP), etc.) or may be created (e.g., custom protocols) to configure how the browser 120 fetches the resource 152.

As with the browser 120, the authentication manager 200 is configured to interpret a reference R such as a URL 130. This interpretation determines whether the reference R refers to a resource 152 whose access requests some degree of authentication. To make this determination, the authentication manager 200 is configured to use the format 132 of the URL 130. Based on how the authentication manager 200 interprets the format 132, the authentication manager 200 may authenticate the user 10 to access the requested resource 152. In some examples, the authentication manager 200 authenticates the user 10 by providing authentication credentials (e.g., credential data 160) to a webpage 124 requesting authentication. Additionally or alternatively, the authentication manager 200 authenticates the user 10 by submitting the authentication credentials 160 to a webpage 124, such as a login webpage 124*a*, associated with the reference URL 130 and redirecting the browser 120 to the reference URL 130.

In some examples, the authentication manager 200 interprets the format 132 of a reference R such as a URL 130 by determining whether the format 132 of the reference URL 130 adheres to an authentication protocol 202. The authentication protocol 202 generally refers to a reference format configured by the authentication manager 200. The authentication protocol 202 may be pre-programmed by a developer or administrator of the authentication manager 200 or configured by the user 10. In some implementations, updates or development of a browser 120 communicating with the authentication manager 200 also update or modify the authentication protocol 202. In this respect the authentication protocol 202 may be static or dynamic.

The format 132 of a reference (e.g., URL 130) may include identifiers recognizable by the browser 120 and/or the authentication manager 200. The format 132 may refer to the identifiers. The identifiers may be any combination of syntax characters designated as an element of an authentication protocol 202 by the authentication manager 200. For example, with respect to a reference URL 130, these characters correspond to valid URL characters. The browser 120 and/or authentication manager 200 may be configured to recognize different combinations of identifiers to detect that the user 10 is navigating to a webpage 124 that requests authentication. The webpage 124 that requests authentication includes a web authentication host reference, such as a web authentication host URL 132, 132*a*. Some examples of identifiers within the format 132 include a protocol identifier 132, 132*b*, a credential identifier 132, 132*c*, and a user identifier 132, 132*d* (FIG. 2B). Depending on the configuration, the authentication protocol 202 may combine or include additional identifiers and still detect that the user 10 is navigating to a webpage 124 that requests authentication. In some examples, the authentication protocol 202 combines the credential identifier 132*c* and the user identifier 132*d* into a single identifier, such as a user credential identifier 132, 132*e* (e.g., FIG. 2C). In some implementations, identifiers are configured to publically obfuscate an identity of the user 10 navigating with a reference URL 130 having the authentication protocol 202. For example, the user identifier 132*d* and/or credential identifier 132*c* include object identifiers (OIDs), such as a unique string of character or numbers.

In some implementations, the authentication protocol 202 refers to a format 132 that includes a web authentication host URL 132, 132*a* and a credential identifier 132, 132*c*. When the authentication manager 200 receives a reference URL 130 that adheres to the authentication protocol 202 with a respective web authentication host URL 132*a* and a respective credential identifier 132, 132*c*, the authentication manager 200 is configured to extract the web authentication host URL 132, 132*a* and the credential identifier 132, 132*c* from the reference URL 130. With the extracted credential identifier 132*c*, the authentication manager 200 obtains credential data 160 based on the credential identifier 132*c* from the remote service 150. The authentication manager 200 incorporates the obtained credential data 160 along with the web authentication host URL 132*a* into web authentication instructions 170. The authentication manager 200 sends the web authentication instructions 170 to the browser 120 to authenticate the user 10 (e.g., at the web authentication host URL 132*a*).

The credential data 160 refers to a type of digital verification to indicate an identity (e.g., the identity of the user 10). In some configurations, the credential data 160 includes credentials 162 and data related to credentials 162. Resources such as webpages 124 use credential data 160 to indicate that the identity has permission to access content of the webpage 124. Yet the degree of complexity of the credential data 160 may vary. In other words, credential data 160 and/or credentials 162 may provide evidence as to an identity's authority, status, rights, privileges, etc. with respect to the webpage 124. For example, the credential data 160 includes credentials 162 such as a username 162*a* (FIG. 2A) and a password 162*b* (FIG. 2A) corresponding to the user 10. Another example of a credential 162 is an access key such as a unique link (e.g., a unique URL) to reference the webpage 124. Additionally or alternatively, the credential data 160 may be any data corresponding to the user 10 that may authenticate an identity of the user 10 such as personal questions (e.g., about banking, residencies, employers, education, etc.), digital certificates, digital signatures, or digital representations of user biometrics.

A credential identifier 132*c* generally refers to a syntax of characters that may be interpreted (e.g., by the authentication manager 200) to identify credentials 162 and/or credential data 160. In some examples, credential identifiers 132*c* are used in context with other identifiers (e.g., user identifiers 132*d*) or other portions of a reference R to a resource (e.g., a web authentication host URL 132*a*) to identify credentials 162 and/or credential data 160. In some implementations, credential identifiers 132*c* refer to a location that stores credential data 160.

FIGS. 2A-2F are examples of the authentication manager 200. The authentication manager 200 includes an observer 210, an extractor 220, and an obtainer 230. The observer 210 is configured to identify the authentication protocol 202 of the authentication manager 200. As the authentication manager 200 receives a reference URL 130, the observer 210 inspects each reference URL 130 to determine whether the reference URL 130 has a respective format 132 that adheres the authentication protocol 202. For example, the observer 210 receives each reference URL 130 when the address field 122 of the browser 120 receives a URL 130 from the user 10. When the observer 210 encounters a reference URL 130 with the authentication protocol 202, the observer 210 communicates that reference URL 130 to the extractor 220. Generally, the format 132 of the reference URL 130 adheres to the authentication protocol 202 when the format 132 includes elements (e.g., identifiers) that correlate to elements of the authentication protocol 202.

Additionally or alternatively, the observer 210 may be configured to identify part or all of the authentication protocol 202 within the reference URL 130. For example, the observer 210, instead of identifying each identifier within a received reference URL 130, may be configured to identify whether a particular identifier 132 (e.g., protocol identifier 132b, credential identifier 132c, or user identifier 132d) exists within the received reference URL 130. Moreover, the observer 210 may communicate the reference URL 130 to the extractor 220 when the observer 210 identifies that a reference URL 130 includes the customer protocol identifier 132b. By identifying a particular identifier 132, the authentication manager 200 reduces processing time at the obtainer 230 to allow the authentication manager 200 to more efficiently detect webpages 124 with authentication without compromising navigation speed of the browser 120.

In some implementations, the observer 210 is configured to identify when reference URLs 130 include web authentication host URLs 132a. In these implementations, when the observer 210 identifies a reference URL 130 with the web authentication host URL 132a, the observer 210 communicates the reference URL 130 to the extractor 220. In order to identify a web authentication host URL 132a, in some examples, the authentication manager 200 stores a list of web authentication host URLs 132a that the observer 210 references as the observer 210 receives reference URLs 130. As the user 10 acquires credential data 160 for various web pages 124, the user 10 may store the credential data 160 with the associated web authentication host URL 132a in a credential database (e.g., storage resource 156) accessible to the authentication manager 200. As the credential database (e.g., storage resource 156) is accessible to the authentication manager 200, the observer 210 may reference an up-to-date list of web authentication host URLs 132a.

The extractor 220 receives the reference URL 130 from the observer 210 and is configured to extract identifiers from the received reference URL 130. FIGS. 2A-2E depict examples of different representations of reference URLs 130 received by the extractor 220. Here, the braces within the examples of different reference URLs 130 may be replaced with actual data (e.g., various characters). Even though the extractor 220 may be configured to extract any combination of identifiers and to communicate the extracted identifier to the obtainer 230, the extractor 220 is generally configured to extract the credential identifier 132c from the received reference URL 130 to allow the authentication manager 200 to efficiently retrieve credential data 160 associated with the credential identifier 132c. FIGS. 2A-2F depict the extractor 220 parsing the received reference URL 130 for illustration to show the different identifiers included in the format 132 of a reference URL 130 received from the observer 210. In other words, the extractor 220 may simply extract the credential identifier 132c rather than parsing the format 132 into identifiers. As used herein, the format 132 may refer to a collection of one or more identifiers. With the extracted credential identifier 132c, the extractor 220 communicates the credential identifier 132c to the obtainer 230.

Figure 2A:
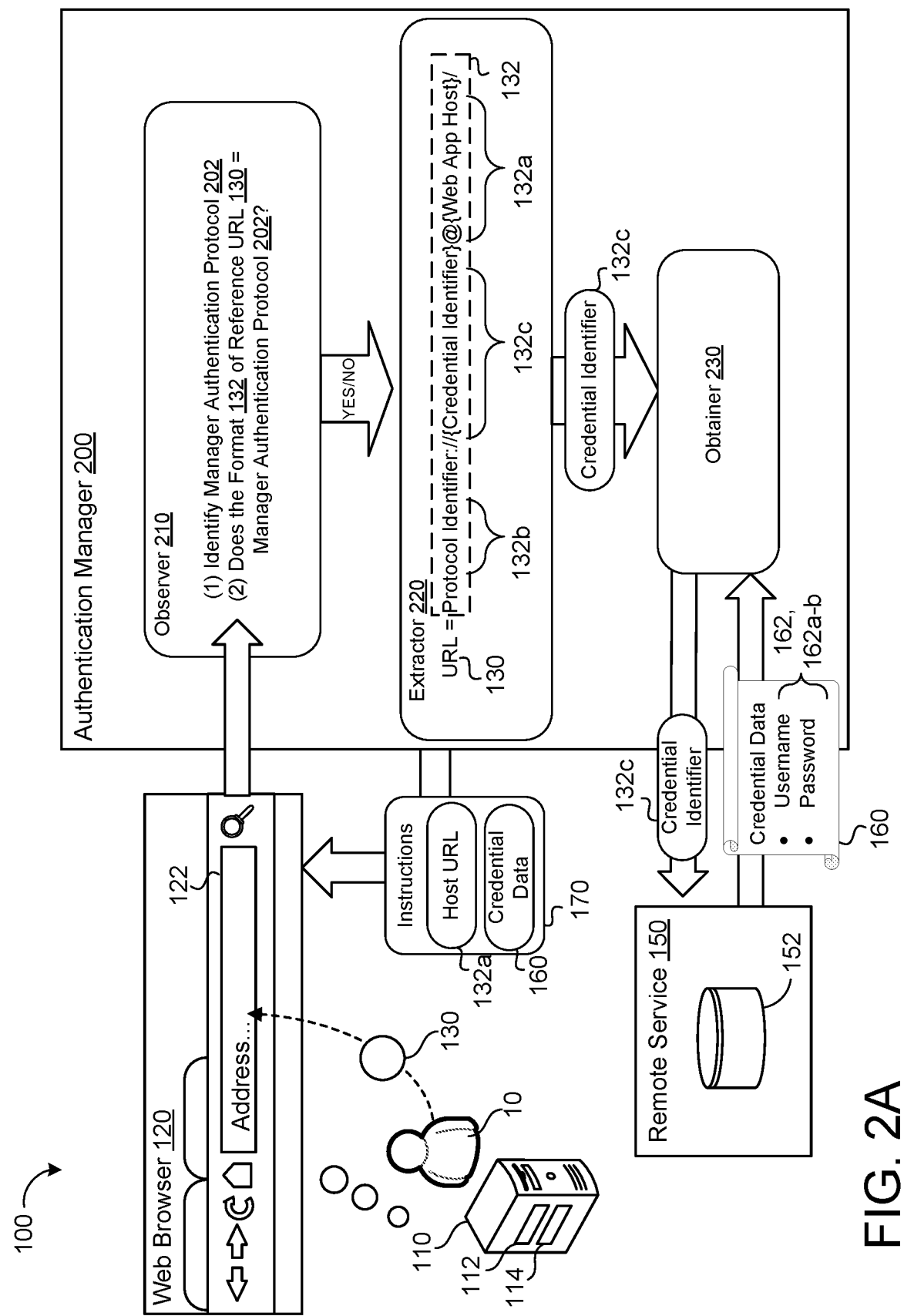
FIGS. 2A-2F are schematic views of example authentication managers interacting within the authentication environment.
Figure 2B:
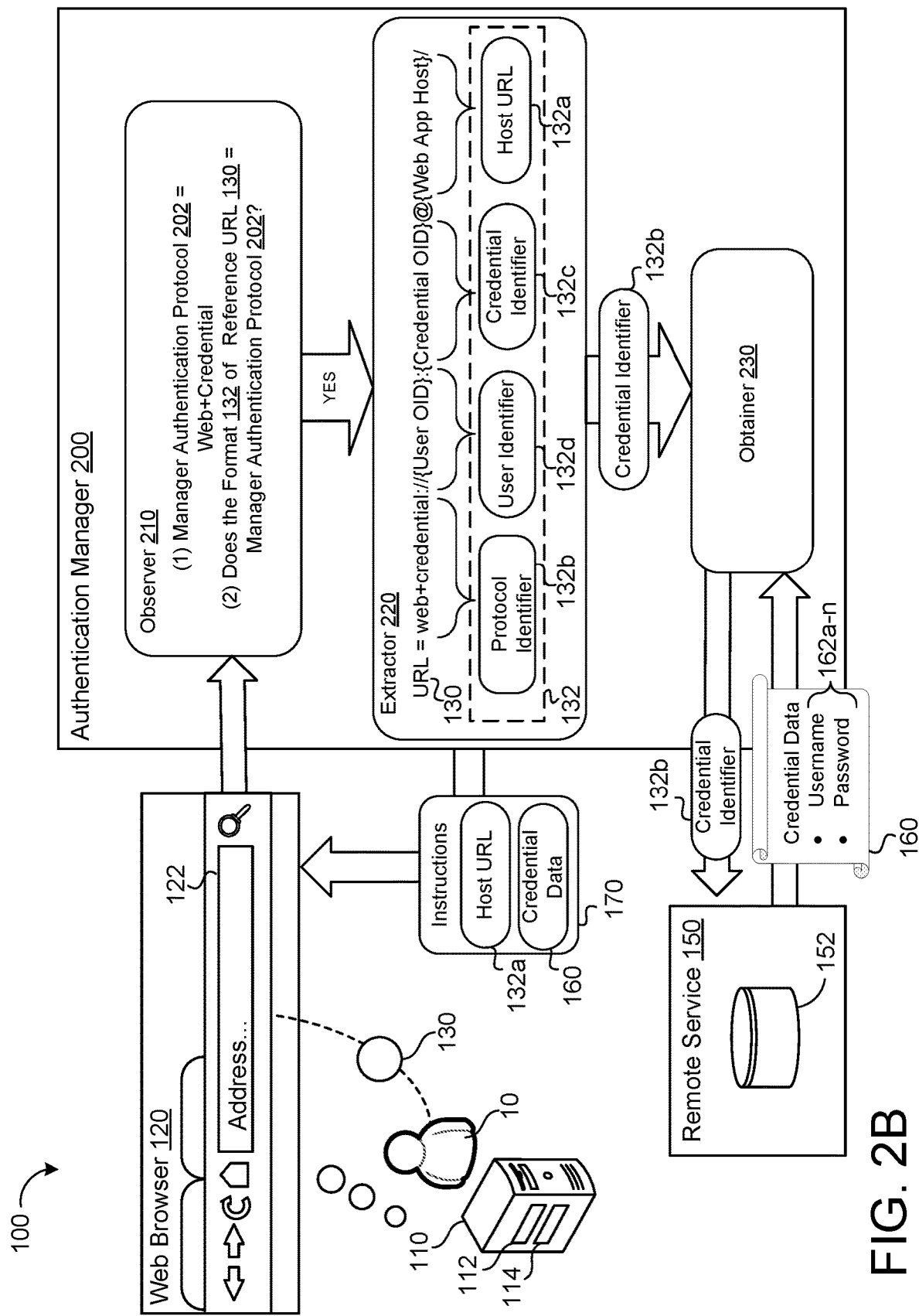
Figure 2C:
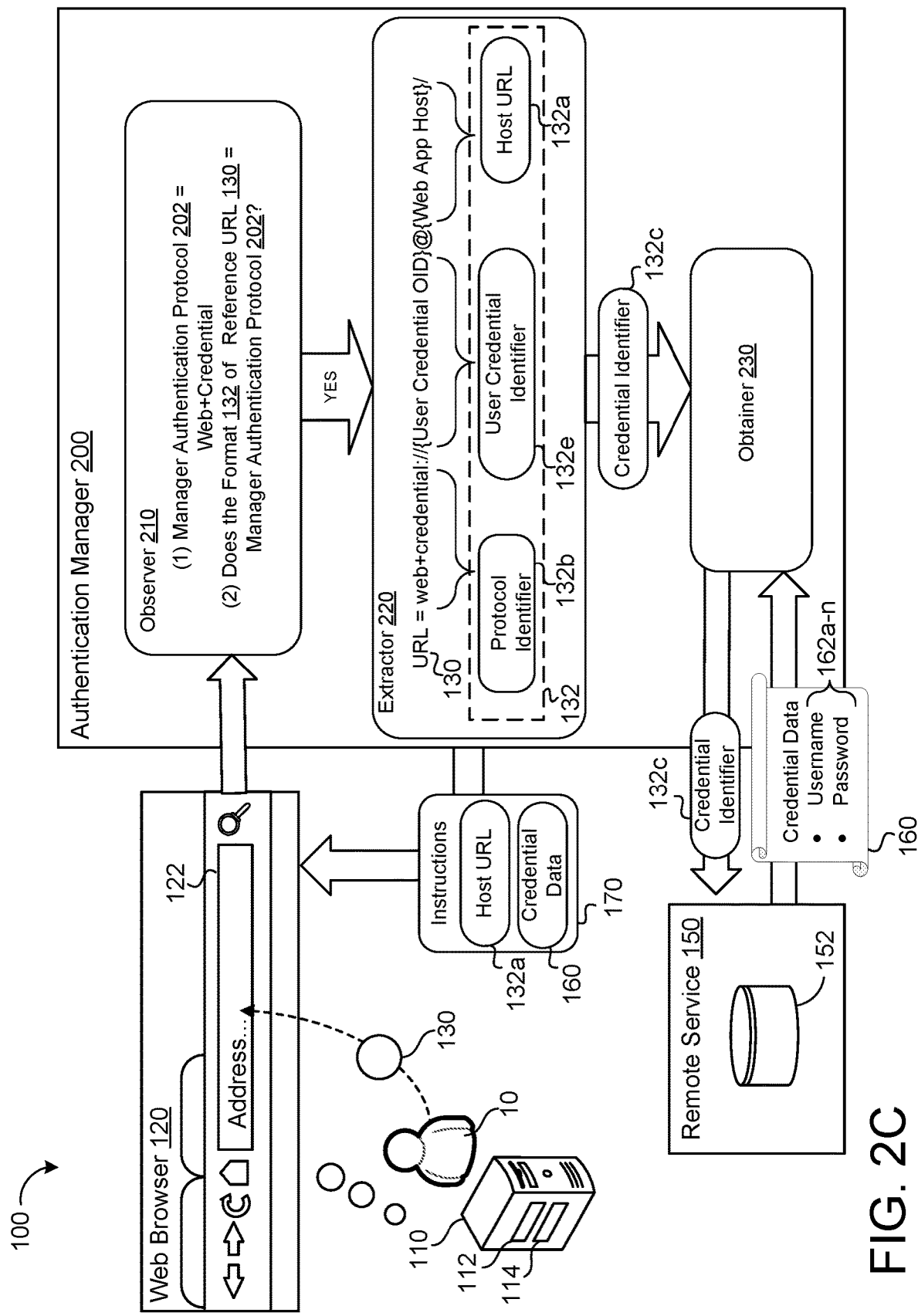

FIG. 2A is a generic example of the reference URL 130 with a representative format 132 of "Protocol Identifier:// {Credential Identifier}@{Web App Host}/" having at least a protocol identifier 132b, a web authentication host URL 132a, and a credential identifier 132c. FIG. 2B is an example where the authentication protocol 202 corresponds to a custom protocol where a reference URL 130 has a representative format 132 of "web+credential://{User OID}: {Credential OID}@{Web App Host}/" Here, the representative format 132 has at least a custom protocol identifier 132b, a web authentication host URL 132a, a credential identifier 132c, and a user identifier 132d. As shown in FIG. 2B, the credential identifier 132c and the user identifier 132d may be object identifiers (OIDs). FIG. 2C is an example similar to FIG. 2B except that the representative format 132 of the reference URL 130 combines the credential identifier 132c and the user identifier 132d into a user credential identifier 132e.

Figure 2D:
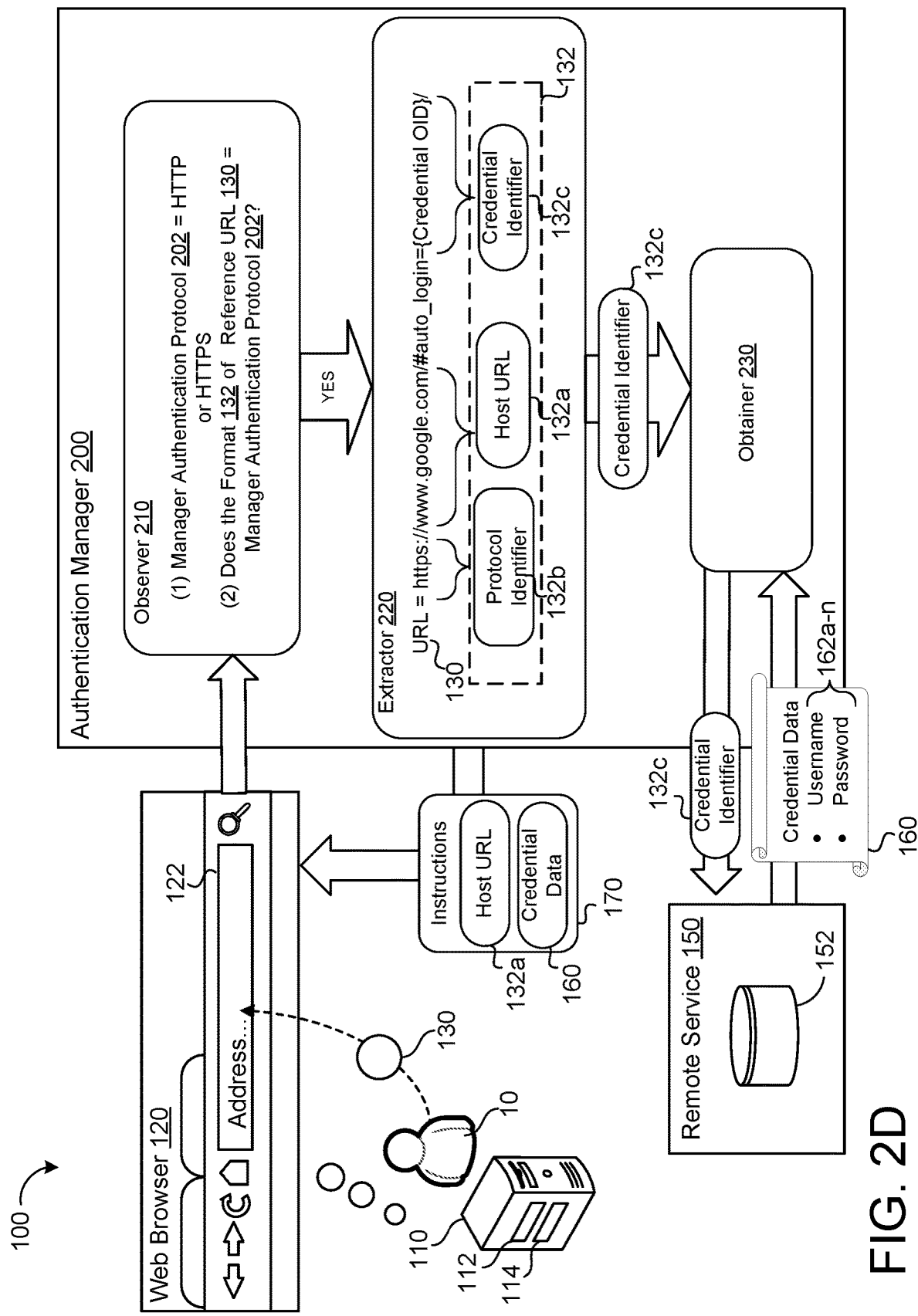

FIG. 2D illustrates an example that the authentication protocol 202 may be associated with HTTP or HTTPS. In this example, the reference URL 130 has a format 132 of "https://www.patent.com/#auto_login={Credential OID}" where "https" is the protocol identifier 132b, "www.patent.com" is the web authentication host URL 132a, and a hash character indicates {Credential OID} as the credential identifier 132c. With a format such as HTTP or HTTPS, the authentication protocol 202 uses existing protocols by appending login information to a hash portion of a respective URL 130. This may be advantageous with current URLs 130, but may cause the authentication manager 200 to parse through more portions of the URL 130 with less uniformity when compared to, for example, a custom protocol identifier 132b for the authentication protocol 202.

Figure 2E:
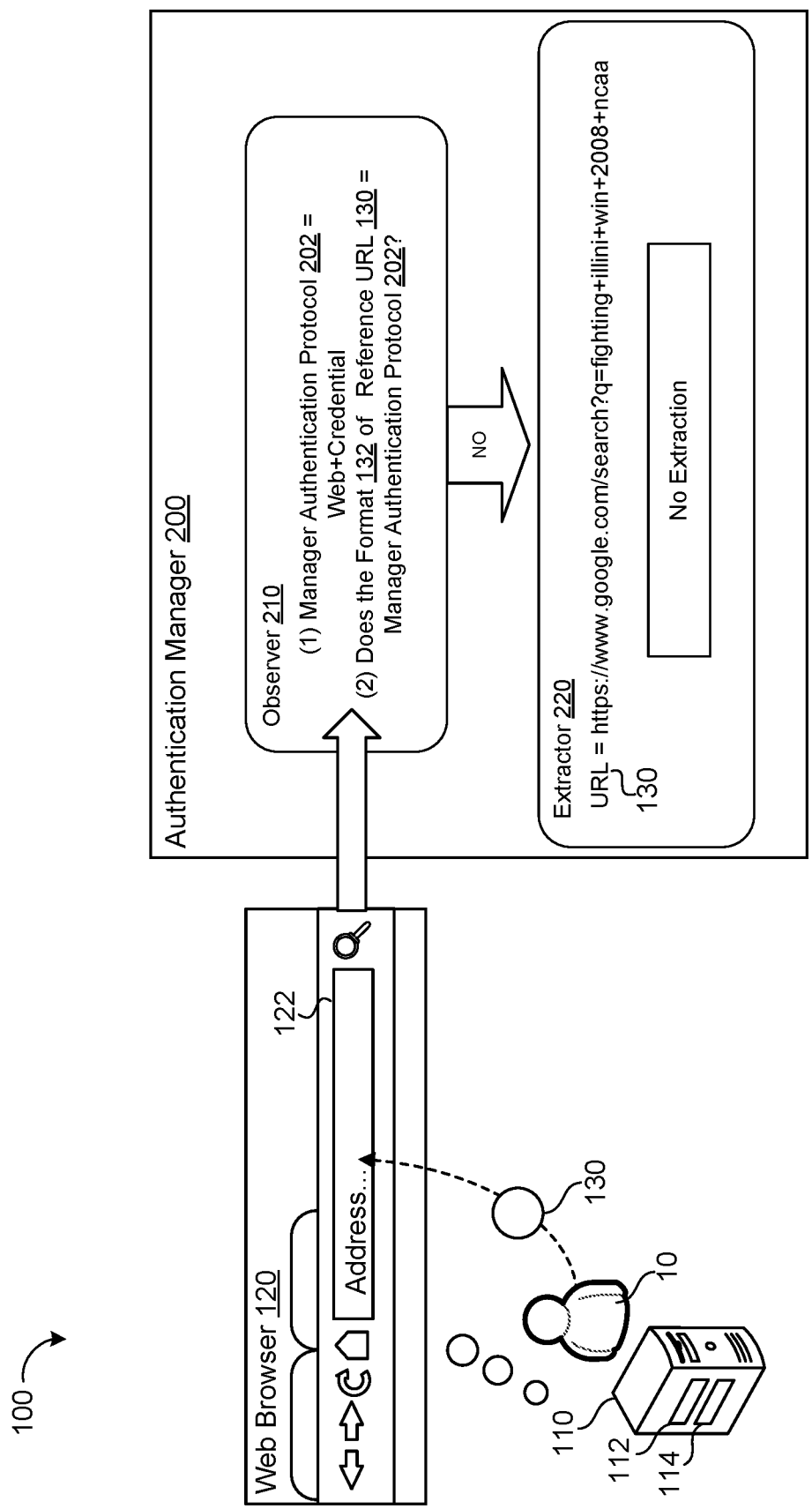

FIG. 2E is an example where the extractor 220 fails to receive the reference URL 130 from the observer 210 and thus does not perform extraction. In this example, the observer 210 recognizes that the reference URL 130 has a format 132 that does not adhere the authentication protocol 202 of "web+credential." Rather, the reference URL 130 as "https://www.google.com/search?q=fighting+illini+win+2008+ncaa" has a format 132 with a http protocol identifier 132b and no credential identifier 132c. Based on this recognition, the observer 210 does not communicate the reference URL 130 to the extractor 220.

Figure 2F:
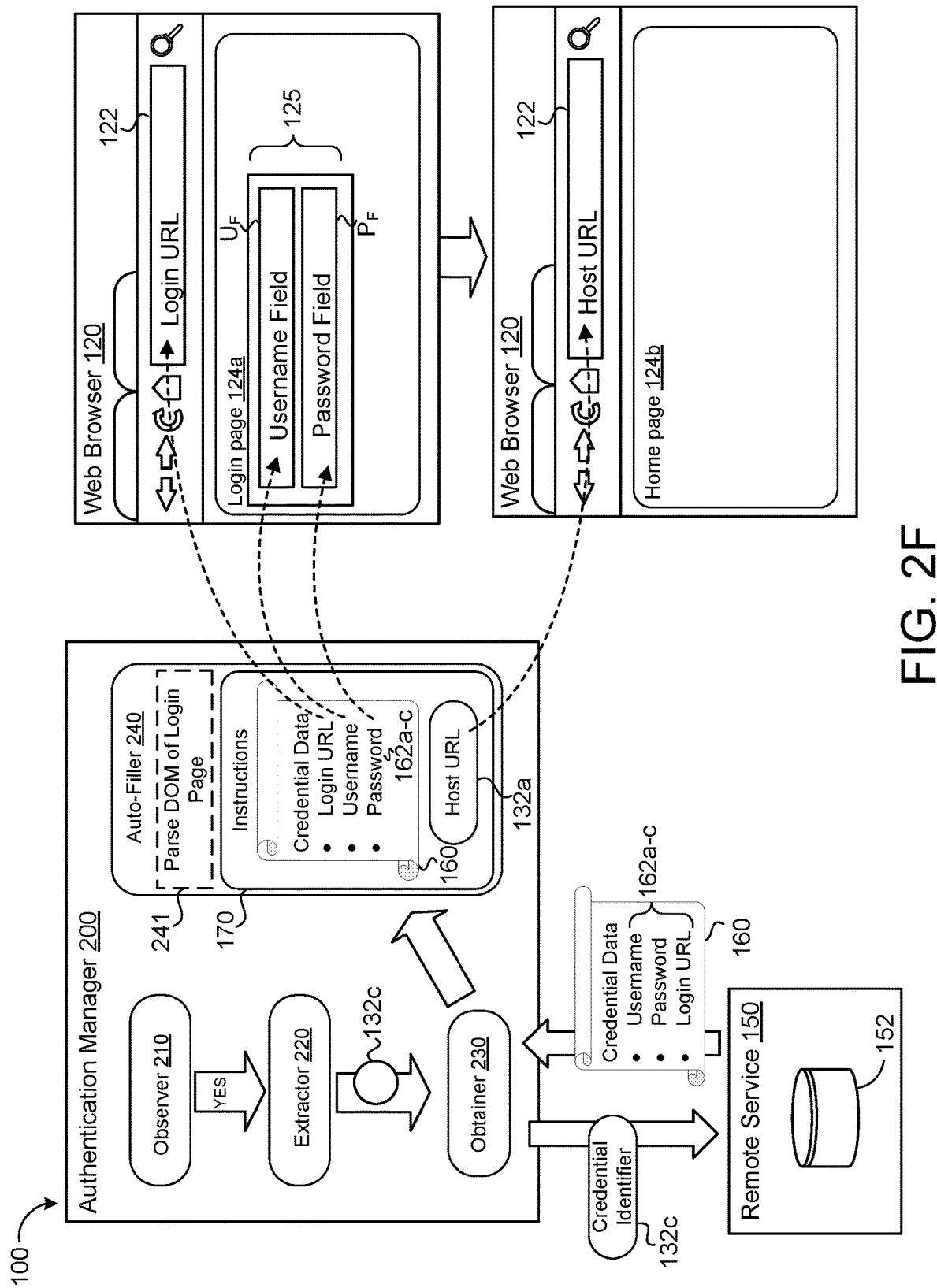

With reference to FIGS. 2A-2D and 2F, the obtainer 230 is configured to use the credential identifier 132c from the extractor 220 to obtain credential data 160 for the reference URL 130. In other words, the obtainer 230 allows the authentication manger 200 to gather raw data requested by the webpage 124 to perform a login indicated by information within the reference URL 130. When the observer 210 identifies a reference URL 130 that adheres to a format 132 of the authentication protocol 202 and the extractor 220 extracts the credential identifier 132c within the reference URL 130, the obtainer 230 uses the credential identifier 132c to retrieve relevant credential data 160 from the remote service 150. In some examples, the credential identifier 132c indicates one or more locations from where the remote service 150 provides credential data 160 relating to the credential identifier 132c. For example, the credential identifier 132c refers a resource within the remote service 150 that stores the credential data 160. In some examples, the obtainer 230 calls on the remote service 150 to provide the related credential data 160. In other examples, the obtainer 230 retrieves the credential data 160 from the remote service 150 based on the credential identifier 132c. In the examples shown, the obtainer 230 receives a username 162a and a password 162b as credential data 160 based on the credential identifier 132c. Referring to FIG. 2F, the obtained credential data 160 may also include a login URL 162c associated with other credential data 160, such as the username 160a and password 162b. In some examples, the obtainer 230 determines the login URL 162c based on the web authentication host URL 132a. In other examples, when the user 10 or the authentication manager 200 creates authentication credentials associated with a web authentication host URL 132a, the authentication credentials generate and/or store the login URL 162c as credential data 160.

The example authentication manager 200 of FIGS. 2A-2F sends web authentication instructions 170 including the credential data 160 and the web authentication host URL 132a. In some examples, the authentication manager sends the web authentication instructions 170 to the browser 120. The web authentication instructions 170 when received by the browser 120, may cause the browser 120 to execute the instructions 170 to login to the web authentication host URL 132a with the credential data 160.

Referring to FIG. 2F, the authentication manager 200 may additionally include an auto-filler 240. The auto-filler 240 receives the web authentication instructions 170 and is configured to auto-populate a login form at the web authentication host URL 132a. For example, a webpage 124 such as a login page 124a or a home page 124b includes the login form 125. In some examples (as indicated by the dashed box in FIG. 2F), the auto-filler 240 accesses a document object model (DOM) 241 associated with the web authentication host URL 132a to perform auto-population of the login form 125. When the auto-filler 240 populates the login form 125, the auto-filler 240 uses the credential data 160 based on the web authentication instructions 170. In some examples, the login form 125 includes a username field $U_F$ and a password field $P_F$, but may include other fields depending on a design of the login form 125 for the webpage 124. As depicted in the example FIG. 2F, the auto-filler 240 executes the web authentication instructions 170 to navigate to the browser 120 to the login URL 162c and populates the username field $U_F$ and the password field $P_F$ located on the login URL 162c with the username 162a and password 162b of the credential data 160 within the web authentication instructions 170. When the login form 125 includes other fields in addition to, or in lieu of, the username field $U_F$ and the password field $P_F$, the auto-filler 240 is configured to communicate with the obtainer 230 to ensure the obtainer 230 provides relevant credential data 160 for the auto-filler 240 to populate the additional fields in login form 125.

In some implementations, the auto-filler 240 authenticates the user 10 by auto-filling the login URL 162c. In these implementations, when the auto-filler 240 fills in the login form 125 of the associated login URL 162c, the auto-filler 240 redirects the browser to the web authentication host URL 132a. To redirect the web authentication host URL 132a, the auto-filler 240 navigates the browser 120 from the login URL 162c provided within the instructions 170 to the web authentication host URL 132a provided by the authentication manager 200. By auto-filling the login page 124a of the login URL 162c and redirecting to the web authentication host URL 132a, the authentication manager 200 prevents the user 10 from having to spend time filling in each field of the login form 125 with credential data 160 or having to navigate back to the web authentication host URL 132a. In some examples, the authentication manager 200 recognizes that the user 10 originally attempted to navigate to a webpage 124 associated with the web authentication host URL 132a and instead redirects the browser 120 to the webpage 124 of the original navigation attempt. For example, the user 10 originally attempted to navigate to a webpage "www.patents.com/US4722098A," and, in response to the attempt, the authentication manager 200 (1) logs the user 10 into the login URL 162c associated with the webpage "www.patents.com/US4722098A," and (2) redirects the user 10 to the webpage 124 corresponding to the file "US4722098" within the web authentication host URL "www.patents.com."

In some examples, the authentication manager 200 prompts the user 10 by asking whether the user 10 wants to auto-populate a respective web authentication host URL 132a. When the user 10 answers affirmatively, the authentication manager 200 activates the auto-filler 240 to fill-in login fields of the login form 125 associated with the respective web authentication host URL 132a. In some cases, the authentication manager 200 allows the user 10 to configure one or more settings. In these cases, the settings may include an option to toggle the auto-filler 240 on or off universally for all web authentication host URLs 132a or for a particular web authentication host URL 132a.

Figure 3A:
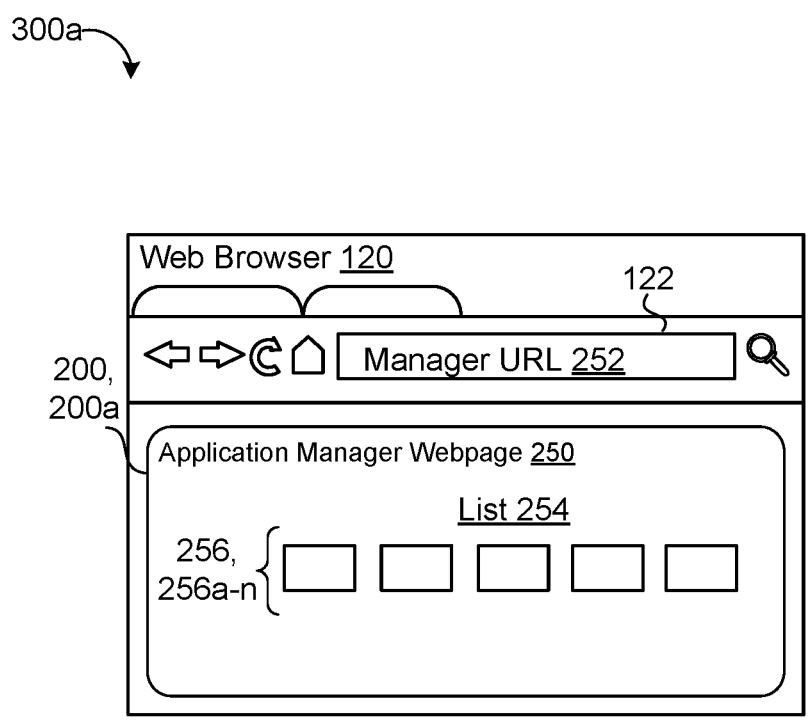
FIG. 3A is a schematic view of an example authentication manager webpage for the authentication manager.
Figure 3B:
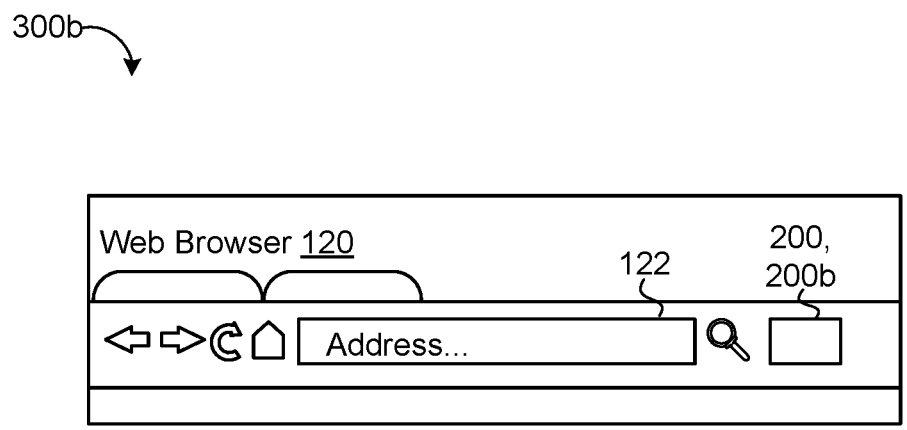
FIG. 3B is a schematic view of an example authentication manager as a browser extension.

Referring back to FIG. 1, the dashed box associated with the authentication manager 200 indicates that the location of the authentication manager 200 within the authentication environment 100 may vary for different applications. For examples, schematic views 300a, 300b of FIGS. 3A and 3B show examples where the authentication manager 200 includes a web application 200a (FIG. 3A) or a browser extension 200b (FIG. 3B). Referring to FIG. 3A, the remote service 150 may host the web application 200, 200a such that the authentication manager 200 is accessible to, yet separate from, the user device 110. In other words, the web application 200, 200a is hosted on a remote server rather than on the user device 110. The web application 200, 200a includes an application manager webpage 250 with an authentication manager URL 252. The user 10 may navigate to the application manager webpage 250 via the authentication manager URL 252. The application manager webpage 250 functions as a central hub for the authentication manager 200. For example, the application manager webpage 250 displays a list 254 of stored web authentication host URLs 256, 256a-n. Each stored web authentication host URL 256 may include the credential data 160 associated with the stored web authentication host URL 256.

In some implementations, the application manager webpage 250 displays each stored web authentication host URL 256 as an icon with a hyperlink. When the user 10 selects the icon, the hyperlink may execute the web authentication instructions 170 and/or initiate the auto-filler 240 of the authentication manager 200 to execute the web authentication instructions 170 for the selected icon. In some implementations, the hyperlink associated with the stored web authentication host URL 256 allows the user 10 to conveniently share the hyperlink to permit another user to login to a webpage 124 related to the stored web authentication host URL 256. The user 10 may also bookmark the hyperlink to quickly access the webpage 124 at a later time. Another advantage of the web application 200, 200a of the authentication manager 200 is that the web application 200, 200a may be accessible across multiple user devices 110 as long as each user device 110 has web access.

FIG. 3B shows the authentication manager 200 as a browser extension 200, 200b, such as a plug-in. Generally, browser extensions customize the functionality of a web browser 120. These browser extensions are commonly built with web programming languages such as HTML, JavaScript, CSS or developed in conjunction with application programming interfaces (APIs). These extensions may be downloaded to hardware of the user device 110 (e.g., downloaded by data processing hardware 112 and stored in memory hardware 114) or hosted by a web provider. Some examples of known extensions include ad blockers, print shortcuts, download managers, translators, privacy features, and browser history organizers. In some implementations, the browser extension 200, 200b is configured to access a document object model (DOM) 241 (FIG. 2F) of a webpage 124 to modify the webpage 124. For example, by accessing the DOM 241, the authentication manager 200 logs into a webpage 124 requesting a login. In some examples, the browser extension 200b is automatically tied into the address field 122 of the browser 120. In other words, when the browser 120 receives a reference R, such as a URL 130 (e.g., at the address field), the reference R is also received by the browser extension 200b.

Figure 3C:
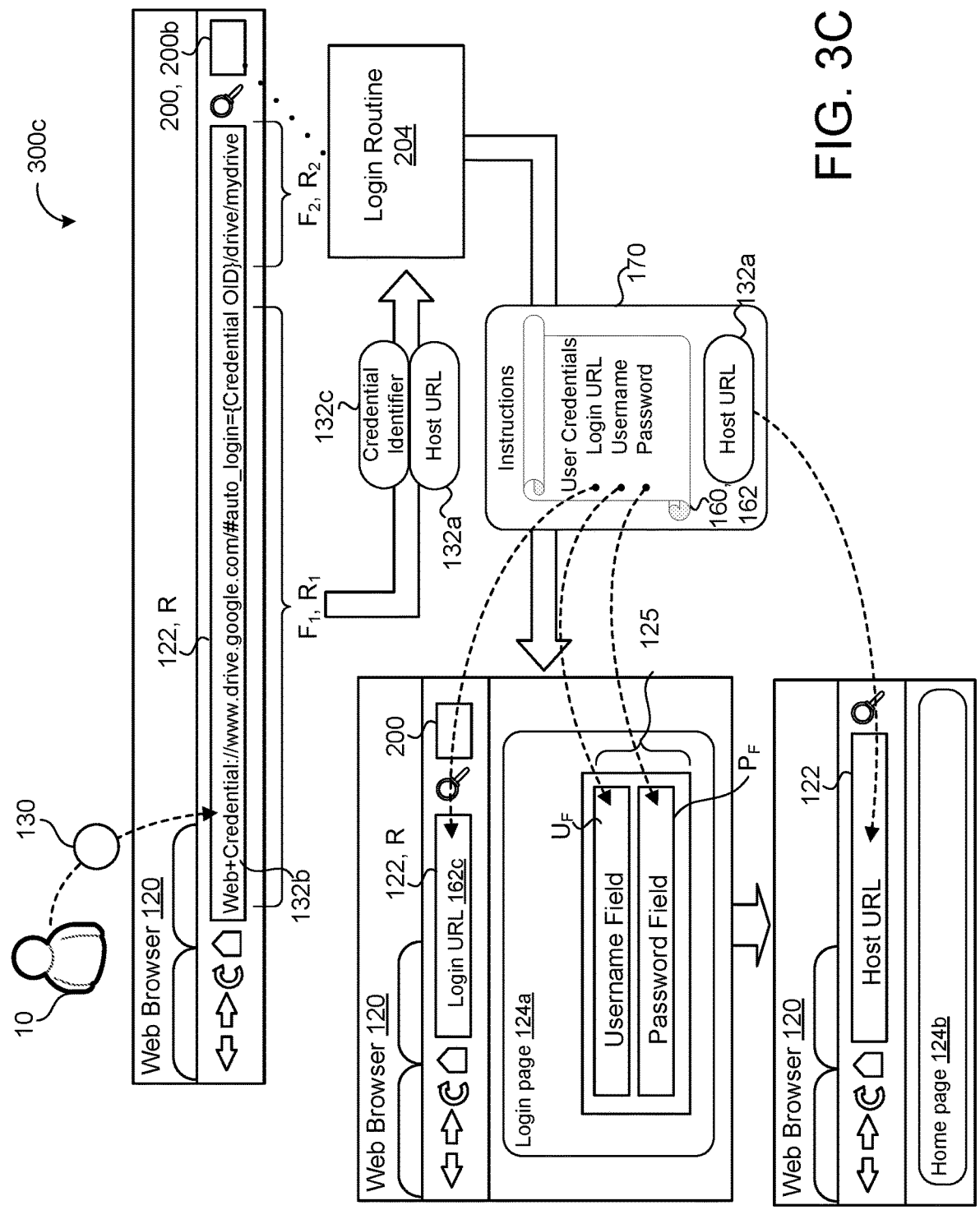
FIGS. 3C and 3D are schematic views of example login routines of an authentication manager at a web browser.
Figure 3D:
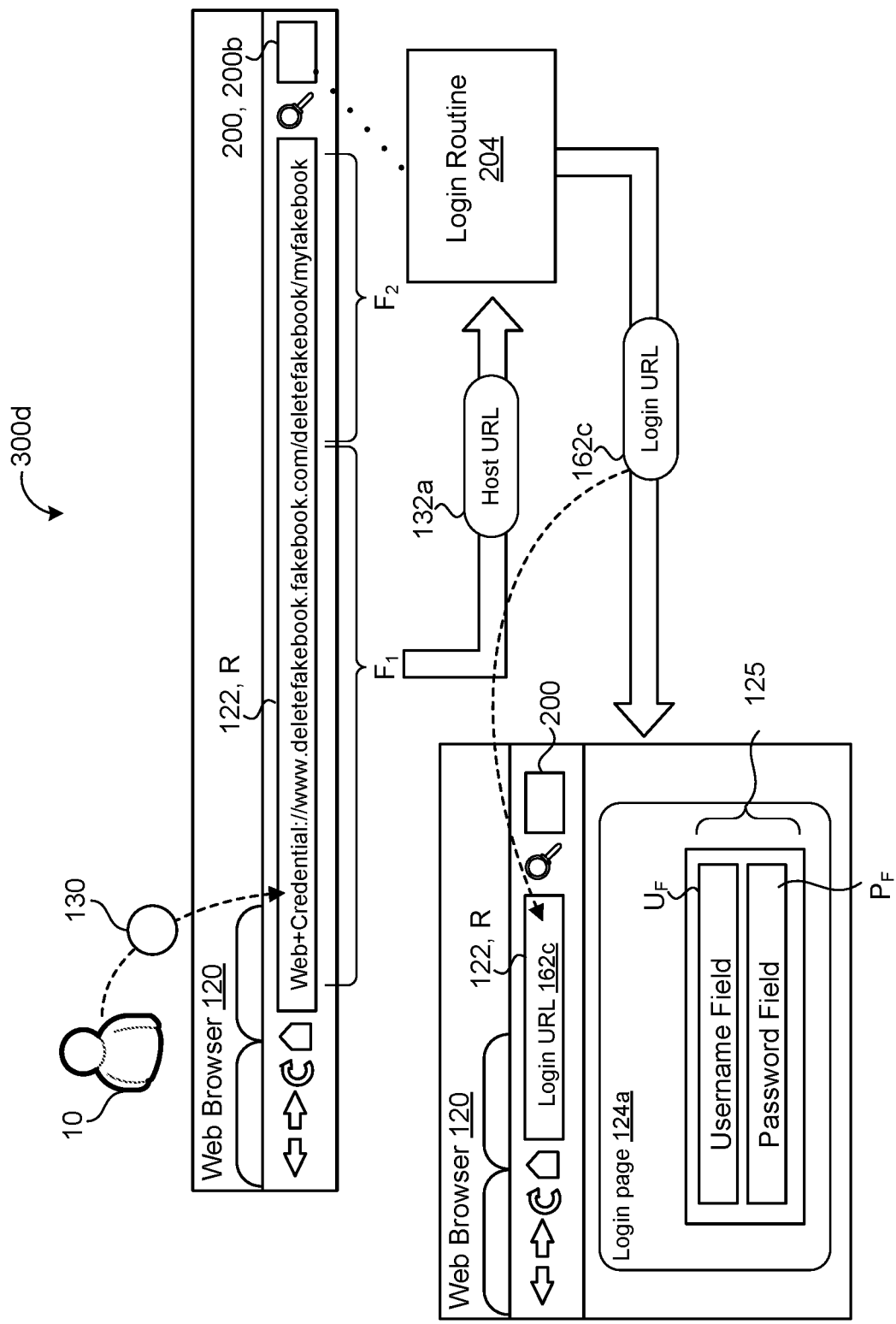

FIGS. 3C and 3D illustrate schematic views 300c, 300d depicting examples of the browser extension 200b. In these examples, the authentication manager 200 subdivides the format 132 of the reference R (e.g., a URL 130) into multiple references (e.g., a first reference $R_1$ and a second reference $R_2$). Here, the authentication manager 200 identifies the first reference $R_1$ as a first protocol formatting $F_1$ and the remaining portion of the reference R, the second reference $R_2$, as a second protocol formatting $F_2$. Based on the first protocol formatting $F_1$, the browser extension 200, 200b executes an automated website login routine 204. In some examples, the first protocol formatting $F_1$ is similar to the authentication protocol 202 previously described such that the login routine 204 executes functions similar to the observer 210, the extractor 220, and the obtainer 230. Here, the automated website login routine 204 extracts a credential identifier 132c and a web host identifier (e.g., identifying a web authentication host URL 132a) from the first reference $R_1$. With the credential identifier 132c, the automated website login routine 204 obtains credential data 160 corresponding to the credential identifier 132c such that the automated website login routine 204 obtains user credentials 162a-n. The user credentials 162 include a URL for a login page 124a (e.g., a login URL 162c) corresponding to the web host identifier. The automated website login routine 204 uses the user credentials 162 to automatically log into the login page 124a.

In some examples, the automated website login routine 204 includes web authentication instructions 170 that insert user credentials 162 into the fields of the login form 125. For example, the automated website login routine 204 executes the authentication instructions 170, navigates to the login URL 162c, and inserts the username 162a and the password 162b into the username field $U_F$ and the password field $P_F$, respectfully. As shown in the example of FIG. 3C, the automated website login routine 204 may additionally or alternatively navigate to the web authentication host URL 132a corresponding to the web host identifier after logging into the login page 124a related to the web authentication host URL 132a.

FIG. 3D is an example where the browser extension 200b recognizes that elements of the first reference $R_1$ are incomplete. For example, the browser extension 200, 200b receives a reference of "web+credential://www.deletefakebook.fakebook.com/deletefakebook/myfakebook." Here, the browser extension 200b divides the reference into ""web+credential://www.deletefakebook.fakebook.com" as the first reference $R_1$ and "deletefakebook/myfakebook" as the second reference $R_2$. Although this reference resembles the first protocol formatting $F_1$ with a protocol identifier 132b, "web+credential" and a web host identifier "www.deletefakebook.fakebook.com," the reference actually fails to include a credential identifier 132c. In this scenario, the automated website login routine 204 is configured to recognize the first reference $R_1$ as an incomplete first protocol formatting and extract the web authentication host URL 132a via the web host identifier. Here, the automated website login routine 204 obtains the login page URL 162c and displays the login page URL 162c for the user 10 instead of automatically logging into the login page 124a associated with the identified web authentication host URL 132a. Additionally or alternatively, the automated website login routine 204 may prompt the user 10 by asking whether the user 10 would like to navigate to the login page URL 162c prior to displaying the login page URL 162c.

Figure 4:
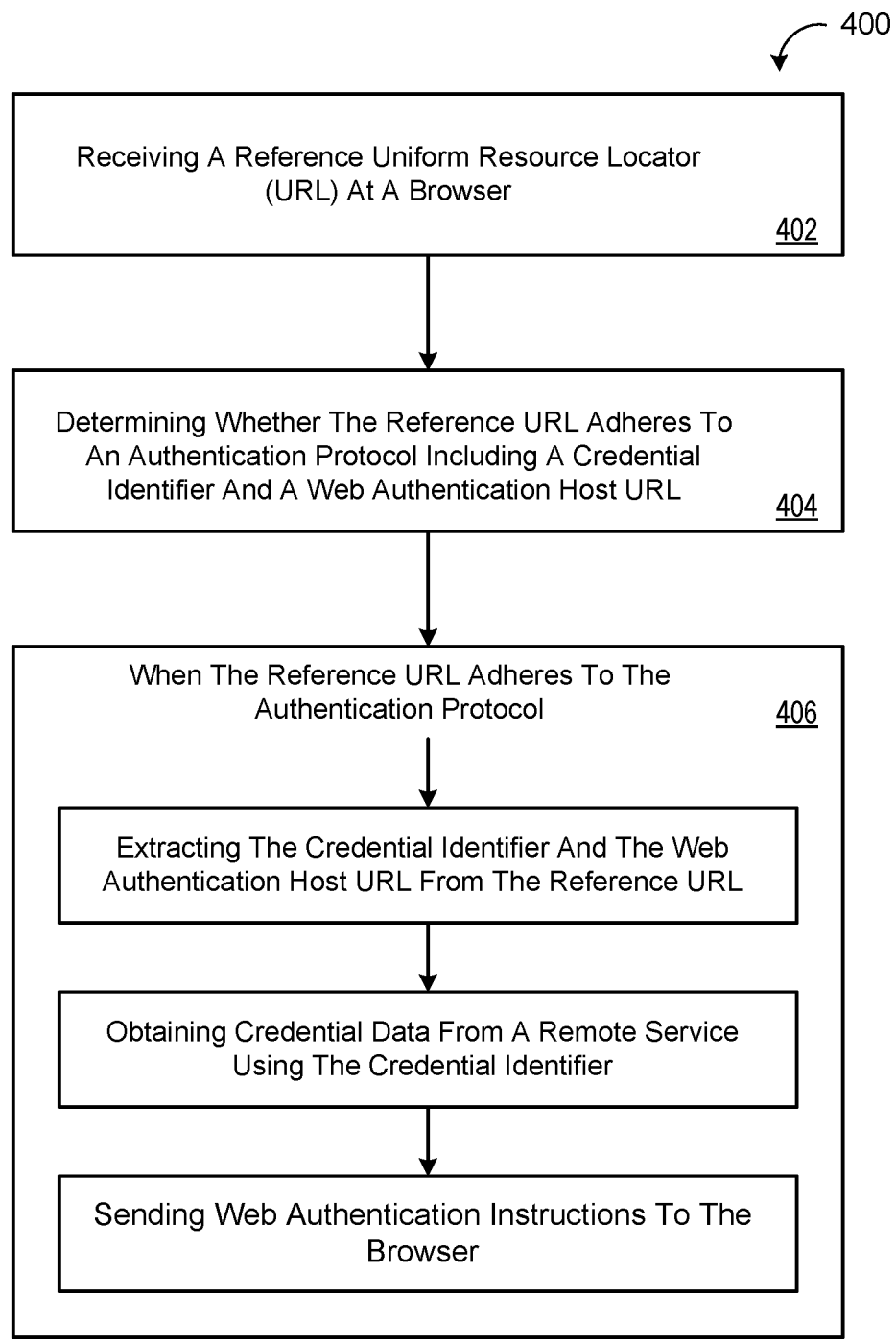
FIG. 4 is a flowchart of an example method for providing website authentication.

FIG. 4 is a flowchart of an example method 400 using the authentication manager 200 to provide website authentication. At block 402, the method 400 receives a reference uniform resource locator (URL) 130 at a browser 120. At block 404, the method 400 determines whether the reference URL 130 adheres to an authentication protocol 202. The authentication protocol 202 includes a credential identifier 132c and a web authentication host URL 132a. At block 406, when the reference URL 130 adheres to the authentication protocol 202, the method 400 includes extracting the credential identifier 132c and the web authentication host URL 132a from the reference URL 130, obtaining credential data 160 from a remote service 150 using the credential identifier 132c, and sending web authentication instructions 170 to the browser 120. The web authentication instructions 170 include the web authentication host URL 132a and the credential data 160.

Figure 5:
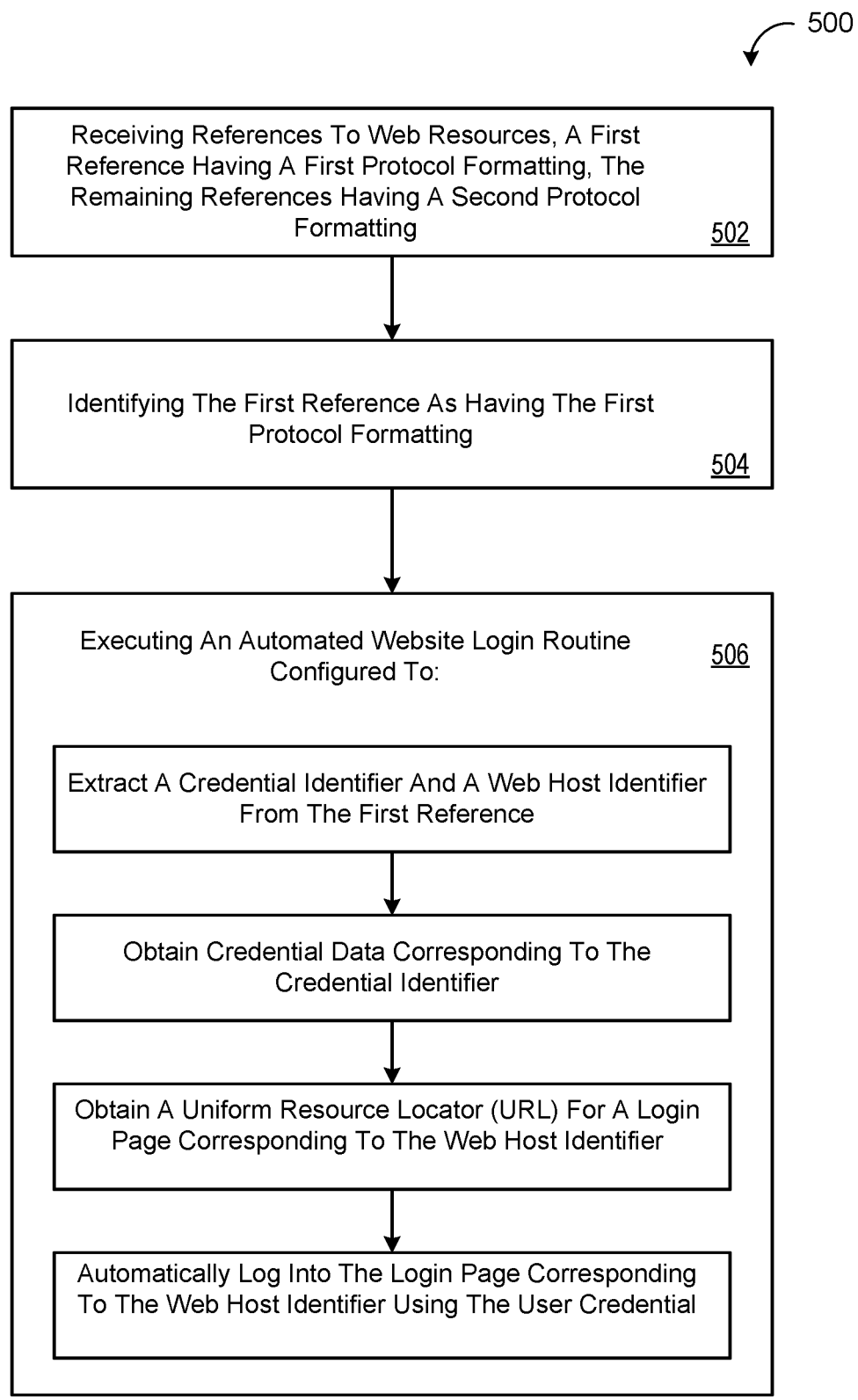
FIG. 5 is a flowchart of an example method for providing website authentication.

FIG. 5 is a flowchart of an example method 500 using the authentication manager 200 to provide website authentication. At block 502, the method 500 receives references R to web resources. A first reference $R_1$ has a first protocol formatting $F_1$ while the remaining references $R_2$ have a second protocol formatting $F_2$. At block 504, the method 500 identifies the first reference $R_1$ as having the first protocol formatting $F_1$. At block 506, the method 500 executes an automated website login routine 204 using the first reference $R_1$. The automated website login routine 204 is configured to: extract a credential identifier 132c and a web host identifier from the first reference $R_1$; obtain credential data 160 corresponding to the credential identifier 132c; obtain a uniform resource locator (URL) 130 for a login page 124a corresponding to the web host identifier; and automatically log into the login page 124a corresponding to the web host identifier using the user credential 162. The credential data 160 obtained when executing the automated website login routine 204 includes a user credential 162.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 6:
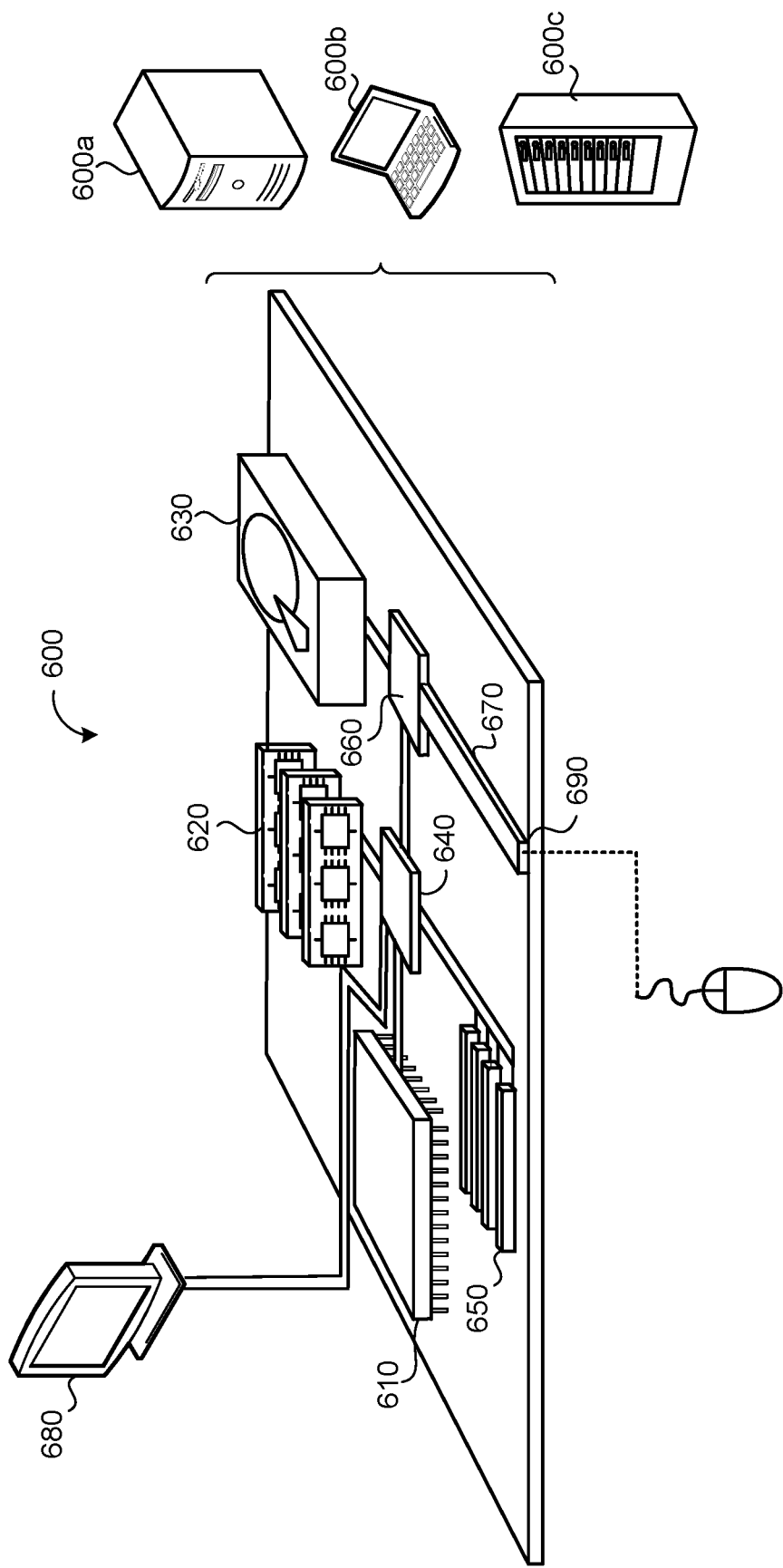
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving, at a browser, a reference uniform resource locator (URL) requesting access to a web resource, the reference URL comprising a credential identifier identifying credential data;
   determining, based on a format of the reference URL, that the web resource adheres to an authentication protocol; and
   in response to determining that the web resource adheres to the authentication protocol:
      obtaining, using the credential identifier, the credential data from a remote service, the credential identifier configured to publicly obfuscate the credential data associated with the credential identifier; and
      sending web authentication instructions to the browser, the web authentication instructions comprising the obtained credential data.

2. The computer-implemented method of claim 1, wherein the authentication protocol comprises a custom protocol identifier.

3. The computer-implemented method of claim 1, wherein the authentication protocol comprises a format of web+credential://{Credential ID}@{Web Host}.

4. The computer-implemented method of claim 1, wherein the authentication protocol comprises a user identifier.

5. The computer-implemented method of claim 4, wherein the user identifier comprises an object identifier configured to publicly obfuscate an identity of a user associated with the user identifier.

6. The computer-implemented method of claim 1, wherein the credential data comprises a username and a password.

7. The computer-implemented method of claim 1, wherein sending the web authentication instructions is configured to cause the browser to auto-populate a login form using the obtained credential data.

8. The computer-implemented method of claim 1, wherein the web authentication instructions further comprise a login URL.

9. The computer-implemented method of claim 8, wherein sending the web authentication instructions is configured to cause the browser to:
   execute the login URL to navigate to a login page;
   determine login fields by parsing a document object model of the login page;
   populate the login fields using the obtained credential data; and
   redirect the browser to a web authentication host URL.

10. A system comprising:
    data processing hardware; and
    memory hardware in communication with the data processing hardware, the memory hardware storing instructions that when executed on the data processing hardware cause the data processing hardware to perform operations comprising:
       receiving, at a browser, a reference uniform resource locator (URL) requesting access to a web resource, the reference URL comprising a credential identifier identifying credential data;
       determining, based on a format of the reference URL, that the web resource adheres to an authentication protocol; and
       in response to determining that the web resource adheres to the authentication protocol:
          obtaining, using the credential identifier, the credential data from a remote service, the credential identifier configured to publicly obfuscate the credential data associated with the credential identifier; and
          sending web authentication instructions to the browser, the web authentication instructions comprising the obtained credential data.

11. The system of claim 10, wherein the authentication protocol comprises a custom protocol identifier.

12. The system of claim 10, wherein the authentication protocol comprises a format of web+credential://{Credential ID}@{Web Host}.

13. The system of claim 9, wherein the authentication protocol comprises a user identifier.

14. The system of claim 13, wherein the user identifier comprises an object identifier configured to publically obfuscate an identity of a user associated with the user identifier.

15. The system of claim 10, wherein the credential data comprises a username and a password.

16. The system of claim 10, wherein sending the web authentication instructions is configured to cause the browser to auto-populate a login form using the obtained credential data.

17. The system of claim 10, wherein the web authentication instructions further comprise a login URL.

18. The system of claim 17, wherein sending the web authentication instructions is configured to cause the browser to:
    execute the login URL to navigate to a login page;
    determine login fields by parsing a document object model of the login page;
    populate the login fields using the obtained credential data; and
    redirect the browser to a web authentication host URL.

* * * * *